United States Patent
Jang et al.

(10) Patent No.: US 12,276,898 B2
(45) Date of Patent: Apr. 15, 2025

(54) CAMERA MODULE

(71) Applicant: LG INNOTEK CO., LTD., Seoul (KR)

(72) Inventors: Young Bae Jang, Seoul (KR); Jong Hyun Kang, Seoul (KR); Sung June Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 554 days.

(21) Appl. No.: 17/630,067

(22) PCT Filed: Jun. 25, 2020

(86) PCT No.: PCT/KR2020/008298
§ 371 (c)(1),
(2) Date: Jan. 25, 2022

(87) PCT Pub. No.: WO2021/020738
PCT Pub. Date: Feb. 4, 2021

(65) Prior Publication Data
US 2022/0276462 A1    Sep. 1, 2022

(30) Foreign Application Priority Data

Jul. 26, 2019   (KR) ................. 10-2019-0091162
Jul. 31, 2019   (KR) ................. 10-2019-0092860

(51) Int. Cl.
*G03B 13/36*   (2021.01)
*G03B 3/10*    (2021.01)
*G03B 5/00*    (2021.01)

(52) U.S. Cl.
CPC ............. *G03B 13/36* (2013.01); *G03B 3/10* (2013.01); *G03B 5/00* (2013.01);
(Continued)

(58) Field of Classification Search
None
See application file for complete search history.

(56) References Cited

U.S. PATENT DOCUMENTS 10,887,498 B2 *  1/2021  Hu ................. H04N 23/57
2002/0112543 A1  8/2002  Nogushi
(Continued)

FOREIGN PATENT DOCUMENTS

CN    1740837 A    3/2006
CN    107924064 A    4/2018
(Continued)

OTHER PUBLICATIONS

Office Action dated May 7, 2024 in Japanese Application No. 2022-502962.
(Continued)

*Primary Examiner* — Rodney E Fuller
(74) *Attorney, Agent, or Firm* — Saliwanchik, Lloyd & Eisenschenk

(57) ABSTRACT

The present invention relates to a camera module comprising: a housing; a lens assembly arranged in the housing; a first driving unit arranged in the lens assembly; a second driving unit which is arranged in the housing and which faces the first driving unit; sensor magnets arranged in the lens assembly and extended in the direction of an optical axis; and a plurality of sensors which are arranged in the housing and which face the sensor magnets, wherein the sensor magnets and the lens assembly are overlapped in a first direction that is vertical with respect to the direction of the optical axis, and in a second direction that is vertical with respect to the direction of the optical axis and the first direction.

18 Claims, 18 Drawing Sheets

(52) U.S. Cl.
CPC ............ *G03B 2205/0007* (2013.01); *G03B 2205/0053* (2013.01); *G03B 2205/0069* (2013.01)

(56) References Cited

U.S. PATENT DOCUMENTS

| | | |
|---|---|---|
| 2007/0153404 A1 | 7/2007 | Rouvinen et al. |
| 2008/0317452 A1* | 12/2008 | Kim .................. G02B 7/08 396/104 |
| 2010/0295952 A1 | 11/2010 | Oh et al. |
| 2013/0162851 A1 | 6/2013 | Shikama et al. |
| 2015/0378169 A1 | 12/2015 | Kim et al. |
| 2018/0003920 A1 | 1/2018 | Hu et al. |
| 2018/0017844 A1* | 1/2018 | Yu .......................... G02B 7/04 |
| 2018/0100986 A1 | 4/2018 | Kim et al. |
| 2019/0377155 A1* | 12/2019 | Bachar ................ H04N 23/55 |

FOREIGN PATENT DOCUMENTS

| | | |
|---|---|---|
| JP | 8-86949 A | 4/1996 |
| JP | 2006-58512 A | 3/2006 |
| JP | 2006-65129 A | 3/2006 |
| JP | 2006-178085 A | 7/2006 |
| JP | 2007-256144 A | 10/2007 |
| JP | 2008-76193 A | 4/2008 |
| JP | 2008-76194 A | 4/2008 |
| JP | 3200481 U | 10/2015 |
| JP | 2017-58523 A | 3/2017 |
| KR | 10-2015-0073368 A | 7/2015 |
| KR | 10-2016-0005927 A | 1/2016 |
| KR | 10-1653762 B1 | 9/2016 |
| KR | 10-2017-0033663 A | 3/2017 |
| KR | 10-2018-0137278 A | 12/2018 |
| KR | 10-2019-0087801 A | 7/2019 |
| WO | 2018/007981 A1 | 1/2018 |
| WO | 2018/044083 A1 | 3/2018 |

OTHER PUBLICATIONS

International Search Report dated Dec. 30, 2020 in International Application No. PCT/KR2020/008298.
Supplementary European Search Report dated Jan. 11, 2023 in European Application No. 20847540.0.
Office Action dated Apr. 27, 2023 in Chinese Application No. 202080053980.5.
Office Action dated Dec. 10, 2024 in Japanese Application No. 2022-502962.
European Office Action dated Jan. 3, 2025 in European Application No. 20 847 540.0.
Office Action dated Oct. 5, 2024 in Korean Application No. 10-2019-0092860.
Office Action dated Oct. 5, 2024 in Korean Application No. 10-2019-0091162.

* cited by examiner

10

CAMERA MODULE

CROSS-REFERENCE TO RELATED APPLICATIONS

This application is the U.S. national stage application of International Patent Application No. PCT/KR2020/008298, filed Jun. 25, 2020, which claims the benefit under 35 U.S.C. § 119 of Korean Application Nos. 10-2019-0091162, filed Jul. 26, 2019; and 10-2019-0092860, filed Jul. 31, 2019; the disclosures of each of which are incorporated herein by reference in their entirety.

TECHNICAL FIELD

The present invention relates to a camera module.

BACKGROUND ART

The camera module photographs a subject and stores it as an image or video, and is installed in mobile terminals such as cell phones, laptops, drones, and vehicles.

Meanwhile, micro camera modules are built in portable devices such as smartphones, tablet PCs, and laptops, and these camera modules can perform an autofocus (AF) function which aligns the focal length of the lens by automatically adjusting the distance between the image sensor and the lens.

A recent camera module can perform a zooming function of zooming up or zooming out by increasing or decreasing the magnification of a distant subject through a zoom lens.

In addition, recent camera modules employ image stabilization (IS) technology to correct or inhibit image shaking due to camera movement caused by an unstable fixing device or a user's movement.

Such image stabilization (IS) technology comprises an optical image stabilizer (OIS) technology, an image stabilization technology using an image sensor, and the like.

OIS technology is a technology that corrects motion by changing the path of light, and image stabilization technology using an image sensor is a technology that corrects movement by mechanical and electronic methods, but OIS technology is being adopted more and more.

Meanwhile, a zoom actuator is used for the zooming function in the camera module, and friction torque is generated when the lens is moved due to the mechanical movement of the actuator, and such a frictional torque causes technical problems such as a decrease in driving force, an increase in power consumption, or a degradation in control characteristics.

In particular, in order to obtain the best optical characteristics by using a plurality of zoom lens groups in the camera module, the alignment between the plurality of lens groups and the alignment between the plurality of lens groups and the image sensor must be well matched, but when decentering, which is a phenomenon in which the center of a spherical surface between lens groups deviates from the optical axis, or tilting, which is a phenomenon of lens inclination, or a phenomenon in which the central axis of the lens group and the image sensor are not aligned occurs, the angle of view is changed or out of focus occurs and it will adversely affect picture quality or resolution.

Meanwhile, when increasing the separation distance in the area where friction occurs to reduce friction torque resistance when moving the lens for zooming function in the camera module, a technical inconsistency problem is occurring, in which lens decentering or lens tilting is deepened during zoom movement or zoom reversing.

Meanwhile, as the image sensor goes to a higher pixel, the resolution increases and the size of the pixel becomes smaller, and as the pixel becomes smaller, the amount of light received at the same time decreases. Therefore, as the resolution of a camera becomes higher, the image shaking due to hand shake that occurs when the shutter speed is slowed in a dark environment becomes more severe.

Accordingly, the OIS function has recently been essentially adopted in order to photograph an image without distortion using a high-resolution camera in a dark night or moving picture.

Meanwhile, OIS technology is a method of correcting image quality by moving the camera's lens or image sensor to correct the optical path, and in particular, OIS technology detects camera movement through a gyro sensor, and based on this, the distance the lens or image sensor needs to move is calculated.

For example, as for the OIS correction method, there are a lens movement method and a module tilting method. In the lens movement method, only the lens in the camera module is moved to realign the center of the image sensor and the optical axis. On the other hand, the module tilting method is a method of moving the entire module comprising the lens and image sensor.

Especially, the module tilting method has a wider correction range than the lens movement method, and since the focal length between the lens and the image sensor is fixed, there is an advantage in that image deformation can be minimized.

Meanwhile, in the case of the lens movement method, a position recognition sensor, for example, a Hall sensor is used to detect the position and movement of the lens. On the other hand, in the module tilting method, a photo reflector is used to detect the movement of the module. However, both methods use a gyro sensor to sense the movement of the camera user.

The OIS controller uses the data recognized by the gyro sensor to predict where the lens or module should move to compensate for the user's movement.

According to the recent technology trend, ultra-slim and ultra-small camera modules are required, but there is a space limitation for OIS operation in the ultra-small camera module, which makes it difficult to implement the OIS function applied to general large cameras, and there is a problem in that it is not possible to implement an ultra-small camera module when OIS driving is applied.

In addition, in the conventional OIS technology, within the limited size of the camera module, as the OIS driver is disposed on the side surface of the solid lens assembly, the size of the lens that is the object of the OIS is limited, making it difficult to secure the amount of light.

In particular, in order to obtain the best optical characteristics by using a plurality of zoom lens groups in the camera module, the alignment between the plurality of lens groups and the alignment between the plurality of lens groups and the image sensor must be well matched, but in the conventional OIS technology, there is a problem that when decentering, which is a phenomenon in which the center of a spherical surface between lens groups deviates from the optical axis, or tilting, which is a phenomenon of lens inclination occurs, the angle of view is changed or defocus occurs, thereby adversely affecting image quality or resolution.

In addition, in the conventional OIS technology, AF or zooming can be implemented at the same time as OIS driving, but due to the space constraints of the camera module and the position of the driving part of the existing OIS technology, the magnet for OIS and the magnet for AF or zooming are placed close to each other, thereby causing magnetic interference, and thus, there is a problem in that the OIS driving does not operate properly, thereby causing decentering or tilting phenomenon.

In addition, since the conventional OIS technology requires a mechanical driving device for lens movement or module tilting, there is a problem in that the structure is complicated and power consumption is increased.

Meanwhile, the content described in the item simply provides background information for the present disclosure and does not constitute prior art.

DETAILED DESCRIPTION OF THE INVENTION

Technical Subject

A subject to be solved by the present invention is to provide a camera module capable of enhancing the detection rate for movement in the optical axis direction of a lens assembly.

A subject to be solved by the present invention is to provide a lens assembly driving device and a camera module comprising the same capable of inhibiting friction torque generated when each lens group is moved through zooming in a camera module.

In addition, a subject to be solved by the present invention is to provide a lens assembly driving device and a camera module comprising the same capable of inhibiting the occurrence of a phenomenon in which lens decentering or lens tilting, and the like, in which the center of the lens and the center axis of the image sensor do not coincide, when each lens group is being moved through zooming in a camera module.

In addition, a subject to be solved by the present invention is to provide an ultra-slim and ultra-compact lens assembly driving device and a camera module comprising the same.

In addition, a subject to be solved by the present invention is to provide a lens assembly driving device and a camera module comprising the same capable of securing sufficient amount of light by eliminating the size limit of the lens in the lens assembly of the optical system when implementing OIS.

In addition, a subject to be solved by the present invention is to provide a lens assembly driving device and a camera module comprising the same capable of achieving the best optical characteristics by minimizing the occurrence of decentering or tilting when implementing OIS.

In addition, a subject to be solved by the present invention is to provide a lens assembly driving device and a camera module comprising the same capable of inhibiting magnetic field interference with magnets for AF or zooming when implementing OIS.

In addition, a subject to be solved by the present invention is to provide a lens assembly driving device and a camera module comprising the same capable of implementing OIS with low power consumption.

Technical Solution

A camera module according to an aspect of the present invention for achieving the above object comprises: a housing; a lens assembly disposed in the housing; a first driving unit disposed in the lens assembly; a second driving unit which is disposed in the housing and which faces the first driving unit; sensor magnets disposed in the lens assembly and extended in the direction of an optical axis; and a plurality of sensors which are disposed in the housing and which face the sensor magnets, wherein the sensor magnets and the lens assembly are overlapped in a first direction that is vertical with respect to the direction of the optical axis, and in a second direction that is vertical with respect to the direction of the optical axis and the first direction.

In addition, the length of the sensor magnet in the optical axis may be greater than a movement stroke of the lens assembly.

In addition, the plurality of sensors may comprise a first sensor and a second sensor spaced apart from the first sensor in the optical axis direction.

In addition, the sum of the distance between the first sensor and the second sensor and the distance of a movement stroke of the lens assembly may correspond to the length of the sensor magnets in the optical axis direction.

In addition, it may comprise a first yoke being disposed between the lens assembly and the sensor magnet.

In addition, the first yoke may surround surfaces of the sensor magnets other than the surface facing the plurality of sensors.

In addition, the lens assembly comprises a first lens assembly and a second lens assembly disposed on one side of the first lens assembly, wherein the sensor magnet comprises a first sensor magnet disposed on the first lens assembly and a second sensor magnet disposed on the second lens assembly, and wherein the first sensor magnet and the second sensor magnet may be spaced apart from each other in a first direction perpendicular to the optical axis, and may have corresponding lengths.

In addition, the first driving unit comprises a first-first driving unit disposed in the first lens assembly and a first-second driving unit disposed in the second lens assembly, wherein the second driving unit may comprise a second-first driving unit facing the first-first driving unit, and a second-second driving unit facing the first-second driving unit.

In addition, it comprises a second yoke disposed between the lens assembly and the first driving unit, wherein the second yoke may comprise: a second-first yoke disposed between the first-first driving unit and the first lens assembly; and a second-second yoke disposed between the first-second driving unit and the second lens assembly.

In addition, the first lens assembly comprises a first lens barrel on which a first lens group is disposed, and a first side surface disposed on one side of the first lens barrel; the second lens assembly comprises a second lens barrel on which a second lens group is disposed, and a second side surface disposed on the other side of the second lens barrel; the first-first driving unit is disposed on the first side surface; the first-second driving unit is disposed on the second side surface; the first sensor magnet is disposed in a space between the first lens barrel and the first side surface; and the second sensor magnet may be disposed in a space between the second lens barrel and the second side surface.

In addition, each of the first lens barrel and the second lens barrel may be formed to have a cylindrical shape, and each of the first side surface and the second side surface may be formed to have a rectangular plate shape.

In addition, it may comprise: a first guide unit disposed in the housing and in contact with the first side surface of the first lens assembly to guide movement of the first lens assembly in the optical axis direction; and a second guide unit disposed on the housing and in contact with the second side surface of the second lens assembly to guide movement of the second lens assembly in the optical axis direction.

In addition, the second-first driving unit may be disposed in the first guide unit, and the second-second driving unit may be disposed in the second guide unit.

In addition, the length of the first side surface of the first lens assembly in the optical axis direction is greater than the sum of the length of the first lens barrel in the optical axis direction and the length of the second lens barrel in the optical axis direction; and the length of the second side surface of the second lens assembly in the optical axis direction may be greater than a sum of the length of the first lens barrel in the optical axis direction and the length of the second lens barrel in the optical axis direction.

In addition, the plurality of sensors may comprise a first-first sensor facing the first sensor magnet, a second-first sensor spaced apart from the first-first sensor in the optical axis direction, and facing the second sensor magnet and a first-second sensor, and a second-second sensor spaced apart from the first-second sensor in the optical axis direction.

In addition, the lens assembly comprises a third lens assembly disposed at the other side of the first lens assembly and coupled to the housing; and each of the first lens assembly and the second lens assembly may move in the optical axis direction with respect to the third lens assembly to implement a zooming function.

In addition, a substrate may be disposed in the housing; and the plurality of sensors may be disposed in the substrate.

In addition, the distance between the sensor magnet and the center of the lens assembly may be shorter than a distance between the first driving unit and the center of the lens assembly.

A camera module according to an aspect of the present invention for achieving the above subjects comprises: a housing; a lens assembly disposed in the housing; a first driving unit disposed in the lens assembly; a second driving unit disposed in the housing and facing the first driving unit; a sensor magnet disposed in the lens assembly and being extended in the optical axis direction; and a plurality of sensors disposed in the housing and facing the sensor magnet, wherein the sum of the distance between the first sensor and the second sensor, and the distance of the movement stroke of the lens assembly may correspond to the length of the sensor magnet in the optical axis direction.

A camera module according to an aspect of the present invention for achieving the above subjects comprises: a housing; a lens assembly disposed in the housing; a first driving unit disposed in the lens assembly; a second driving unit disposed in the housing and facing the first driving unit; a sensor magnet disposed in the lens assembly and being extended in the optical axis direction; and a plurality of sensors disposed in the housing and facing the sensor magnet, wherein the plurality of sensors comprise the first sensor and a second sensor spaced apart from the first sensor in the optical axis direction, wherein the length of the sensor magnet in the optical axis direction is greater than the movement stroke of the lens assembly, and wherein the distance between the first sensor and the second sensor may be greater than a movement stroke of the lens assembly.

A lens assembly driving device according to an aspect of the present invention for achieving the above subjects comprises: a housing; a first lens assembly disposed in the housing; a second lens assembly disposed in one side of the first lens assembly; first and second driving units disposed in the housing; a third driving unit disposed in the first lens assembly and facing the first driving unit; a fourth driving unit disposed in the second lens assembly and facing the second driving unit; and first and second guide units disposed in the housing, wherein the first lens assembly comprises a first side surface facing the first guide unit and a second side surface facing the second guide unit, wherein the second lens assembly comprises a first side surface facing the first guide unit and a second side surface facing the second guide unit, wherein the length of the first side surface of the first lens assembly in the optical axis direction is longer than the length of the first side surface of the second lens assembly in the optical axis direction, and wherein the length of the second side surface of the first lens assembly in the optical axis direction may be shorter than the length of the second side surface of the second lens assembly in the optical axis direction.

In addition, the first guide unit and the second guide unit may be symmetrical with respect to the optical axis.

In addition, the first guide unit comprises a first-first guide unit and a first-second guide unit that are spaced apart from each other; and the second guide unit may comprise a second-first guide unit that is spaced apart from each other, and a second-second guide unit may be comprised.

In addition, the length of the first-first guide unit in a direction perpendicular to the optical axis direction may be longer than the length of the first-second guide unit in a direction perpendicular to the optical axis direction.

In addition, the length of the second-first guide unit in a direction perpendicular to the optical axis direction may be longer than the length of the second-second guide unit in a direction perpendicular to the optical axis direction.

In addition, it may comprise: a first guide ball disposed between the first guide unit and the first side surface of the first lens assembly; a second guide ball disposed between the second guide unit and the second side surface of the first lens assembly; a third guide ball disposed between the first guide unit and the first side surface of the second lens assembly; and a fourth guide ball disposed between the second guide unit and the second side surface of the second lens assembly.

In addition, the first guide unit comprises a first groove in contact with the first guide ball and the third guide ball, the second guide unit comprises a second groove in contact with the second guide ball and the fourth guide ball, the first side surface of the first lens assembly comprises a third groove in contact with the first guide ball, the second side surface of the first lens assembly comprises a fourth groove in contact with the second guide ball, the first side surface of the second lens assembly comprises a fifth groove in contact with the third guide ball, and the second side surface of the second lens assembly may comprise a sixth groove in contact with the fourth guide ball.

In addition, the first groove comprises a first-first groove formed in the first-first guide unit, and a first-second groove formed in the first-second guide unit; and the first guide ball may comprise a first-first guide ball being in contact with the first-first groove at two points, and a first-second guide ball being in contact with the first-second groove at one point.

In addition, the first-first groove may be formed in a 'V' shape, and the first-second groove may be formed in a 'U' shape.

In addition, the third groove comprises a third-first groove facing the first-first groove and a third-second groove facing the first-second groove, the third-first groove is in contact with the first-first guide ball at two points, and the third-second groove may be in contact with the first-second guide ball at two points.

In addition, the third-first and third-second grooves may be formed in a 'V' shape.

In addition, the first driving unit may be disposed between the first-first groove and the first-second groove.

In addition, the first and second guide units may be integrally formed with an inner side surface of the housing.

In addition, an upper surface and a lower surface of the housing may be opened to expose the first and second lens assemblies to the outside.

In addition, a third lens assembly disposed on one side of the second lens assembly, wherein after the third lens assembly is pre-assembled on the side surface of the housing, the first and second lens assemblies may be disposed inside the housing.

In addition, the first lens assembly comprises a first lens barrel comprising a plurality of first holes, and a first lens unit disposed in the first lens barrel; the second lens assembly comprises a second lens barrel comprising a plurality of second holes, and a second lens unit disposed in the second lens barrel; and in a state in which the first and second lens assemblies are assembled to the housing, the first and second lens assemblies may be aligned through upper and lower surfaces of the housing and the plurality of first and second holes.

In addition, the first and second driving units may be solenoid coils, and the third and fourth driving units may be magnets.

In addition, the length of the solenoid coil in the optical axis direction is longer than the length of the magnet in the optical axis direction, and the length of the solenoid coil in a direction perpendicular to the optical axis direction may be longer than the length of the magnet in a direction perpendicular to the optical axis direction.

In addition, a surface of the magnet facing the solenoid coil may be magnetized in a first polarity, and a surface not facing the solenoid coil may be magnetized in a second polarity.

A camera module according to an aspect of the present invention for achieving the above subjects comprises: a housing; a first lens assembly disposed in the housing; a second lens assembly disposed in one side of the first lens assembly; first and second driving units disposed in the housing; a third driving unit disposed in the first lens assembly and facing the first driving unit; a fourth driving unit disposed in the second lens assembly and facing the second driving unit; and first and second guide units disposed in the housing, wherein the first lens assembly comprises a first side surface facing the first guide unit and a second side surface facing the second guide unit, wherein the second lens assembly comprises a first side surface facing the first guide unit and a second side surface facing the second guide unit, wherein the length of the first side surface of the first lens assembly in the optical axis direction is longer than the length of the first side surface of the second lens assembly in the optical axis direction, and wherein the sum of the length of the first side surface of the first lens assembly in the optical axis direction and the length of the first side surface of the second lens assembly in the optical axis direction corresponds to the sum of the length of the second side surface of the first lens assembly in the optical axis direction and the length of the second side surface of the second lens assembly in the optical axis direction.

Advantageous Effects

Through the present embodiment, it is possible to provide a camera module capable of enhancing the detection rate for movement in the optical axis direction of the lens assembly.

Through the present embodiment, it is possible to provide a lens assembly driving device and a camera module comprising the same capable of inhibiting friction torque generated when each lens group is moved through zooming in a camera module.

Through the present embodiment, it is possible to provide a lens assembly driving device and a camera module comprising the same capable of inhibiting the occurrence of a phenomenon in which lens decentering or lens tilting, and the like, in which the center of the lens and the center axis of the image sensor do not coincide, when each lens group is being moved through zooming in a camera module.

In addition, through the present embodiment, it is possible to provide an ultra-slim and ultra-compact lens assembly driving device and a camera module comprising the same.

In addition, through the present embodiment, it is possible to provide a lens assembly driving device and a camera module comprising the same capable of securing sufficient amount of light by eliminating the size limit of the lens in the lens assembly of the optical system when implementing OIS.

In addition, through the present embodiment, it is possible to provide a lens assembly driving device and a camera module comprising the same capable of achieving the best optical characteristics by minimizing the occurrence of decentering or tilting when implementing OIS.

In addition, through the present embodiment, it is possible to provide a lens assembly driving device and a camera module comprising the same capable of inhibiting magnetic field interference with magnets for AF or zooming when implementing OIS.

In addition, through the present embodiment, it is possible to provide a lens assembly driving device and a camera module comprising the same capable of implementing OIS with low power consumption.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

The 'optical axis direction' used below is defined as the optical axis direction of the first optical module and the optical axis direction of the second optical module. Meanwhile, the 'optical axis direction' may correspond to an 'up-down direction', a 'z-axis direction', and the like.

Hereinafter, a camera module according to a first embodiment of the present invention will be described in more detail with reference to the accompanying drawings.

Figure 1:
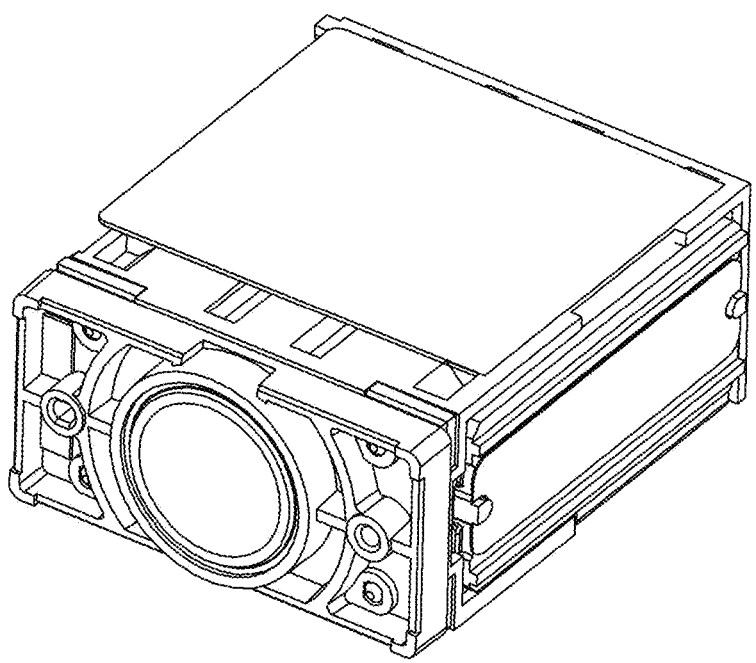
FIG. 1 is a perspective view of a camera module according to a first embodiment of the present invention.
Figure 2:
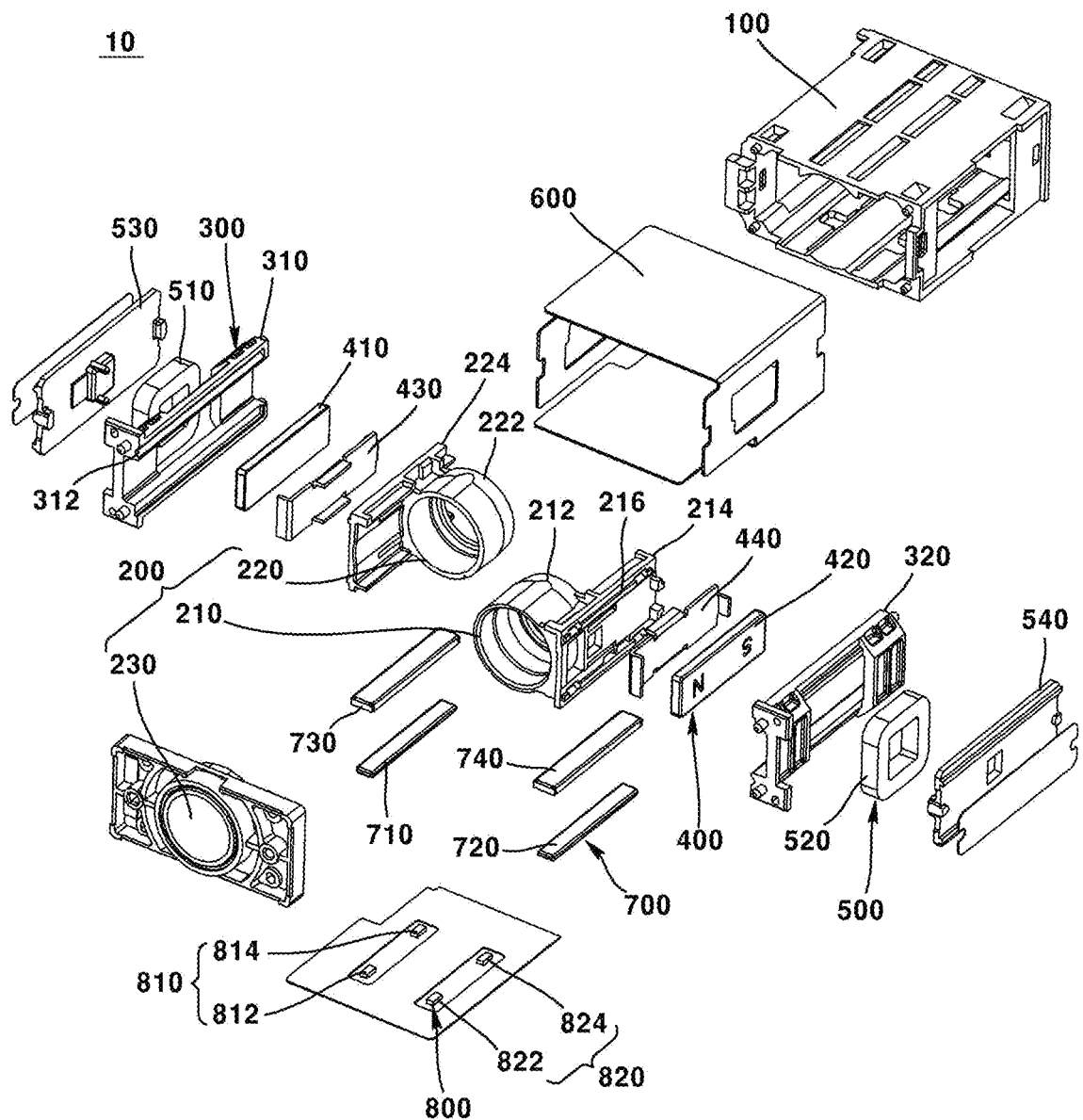
FIG. 2 is an exploded perspective view of a camera module according to a first embodiment of the present invention.
Figure 3:
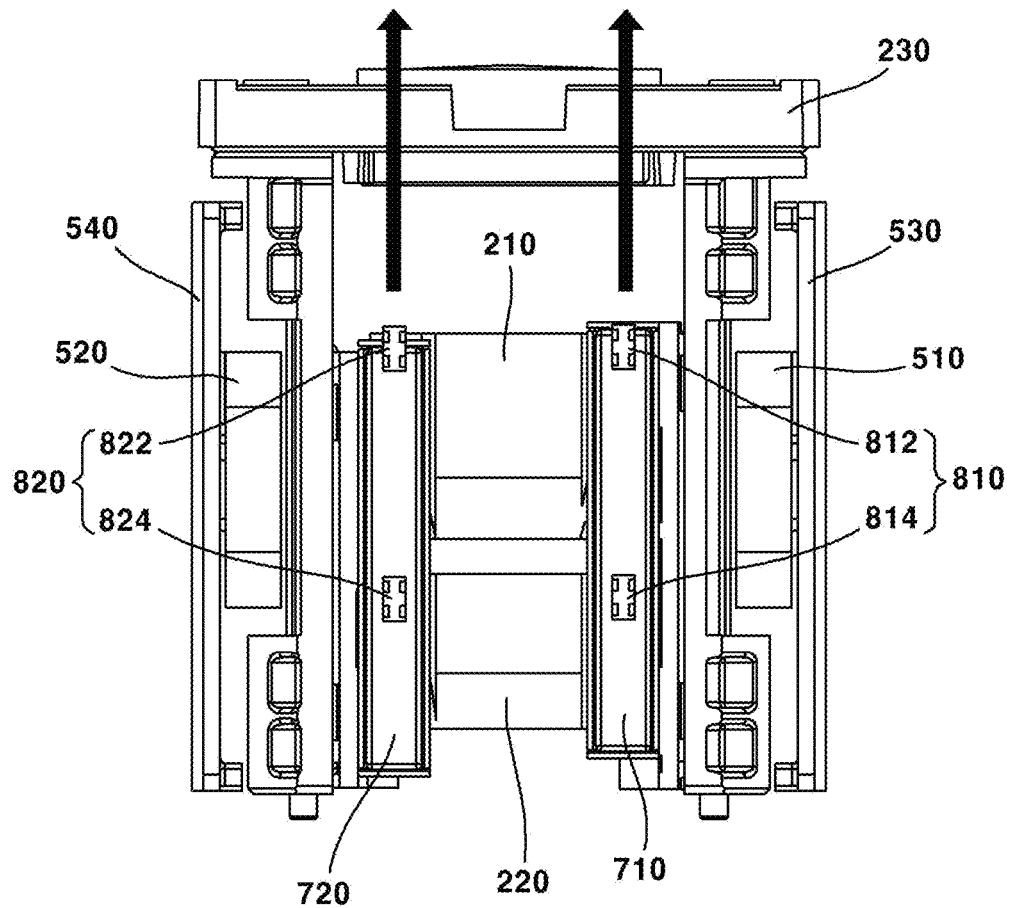
FIG. 3 is a bottom view of some components of a camera module according to a first embodiment of the present invention.
Figure 4:
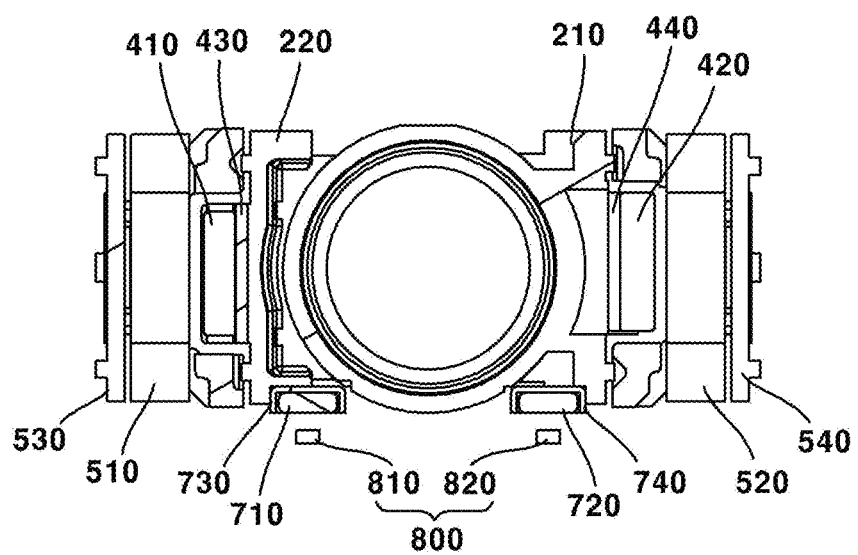
FIG. 4 is a front view of some components of a camera module according to a first embodiment of the present invention.
Figure 5:
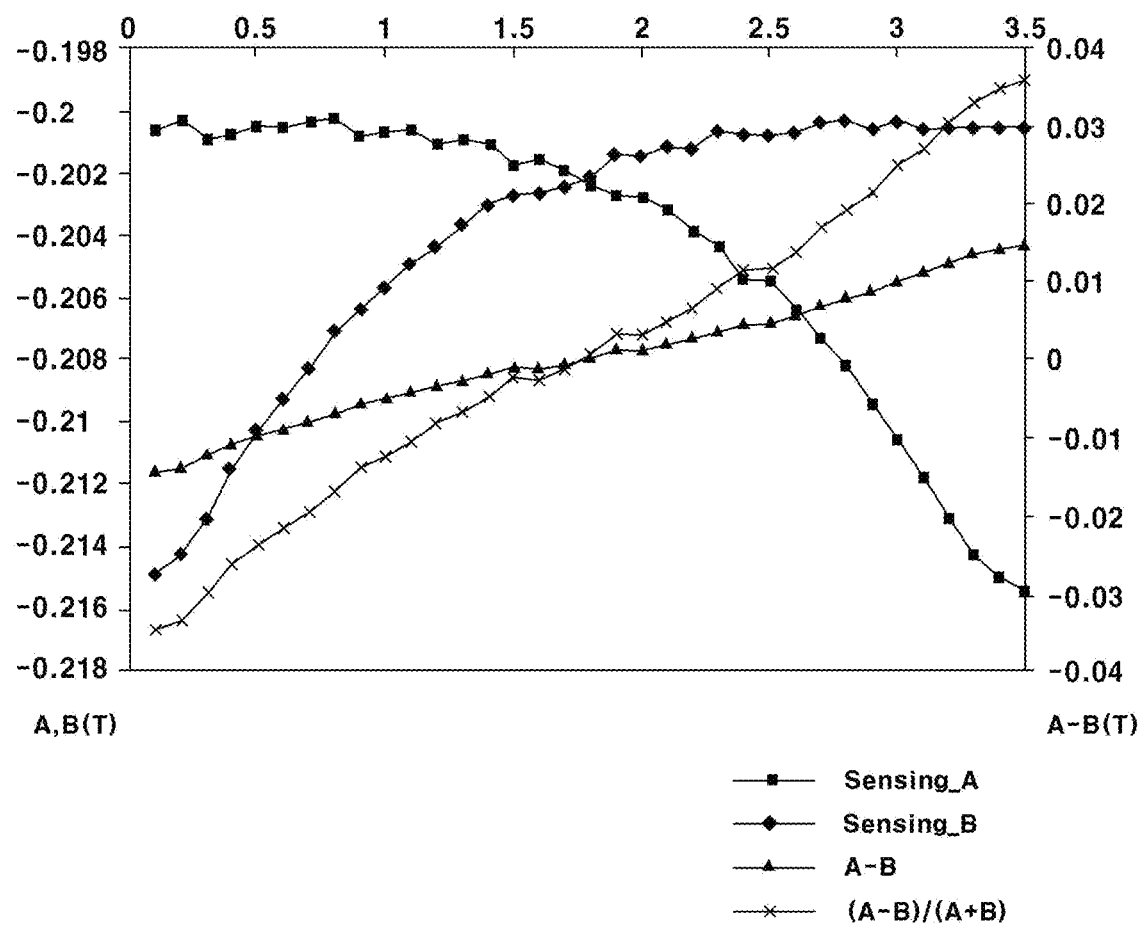
FIG. 5 is a graph showing a magnetic flux simulation of a camera module according to a first embodiment of the present invention.
Figure 6:
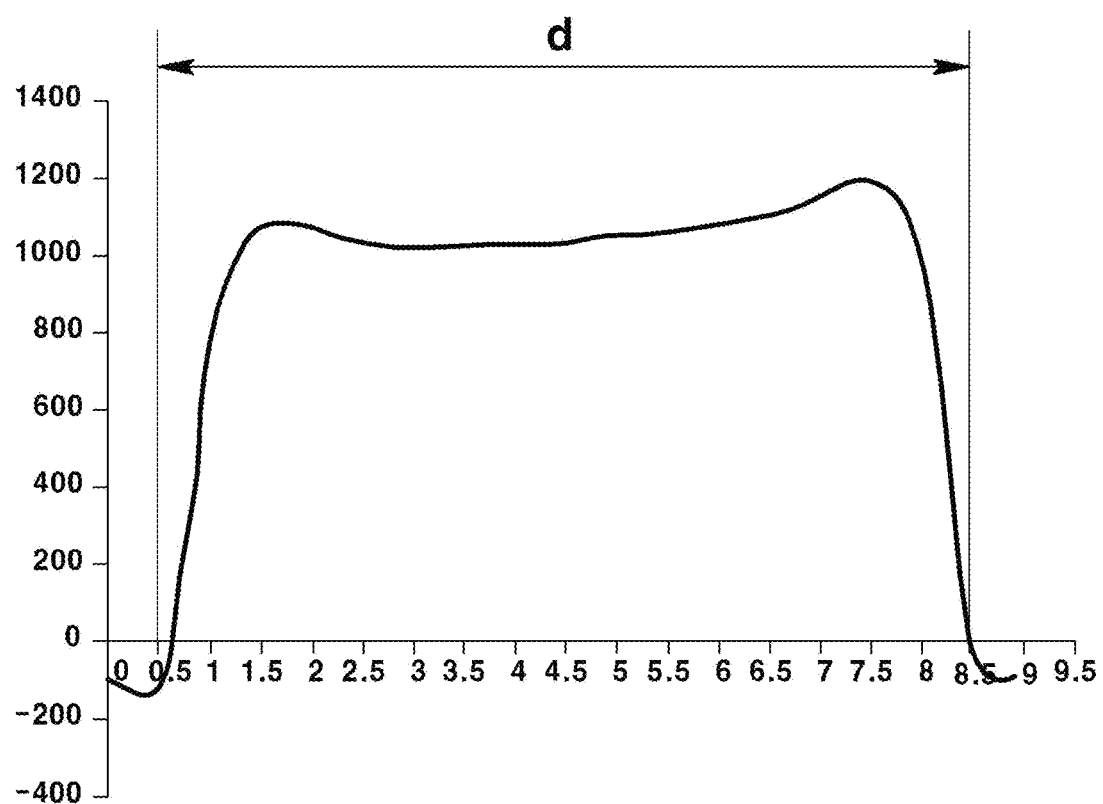
FIG. 6 is a graph showing measurement data of a sensor magnet of a camera module according to a first embodiment of the present invention.
Figure 7:
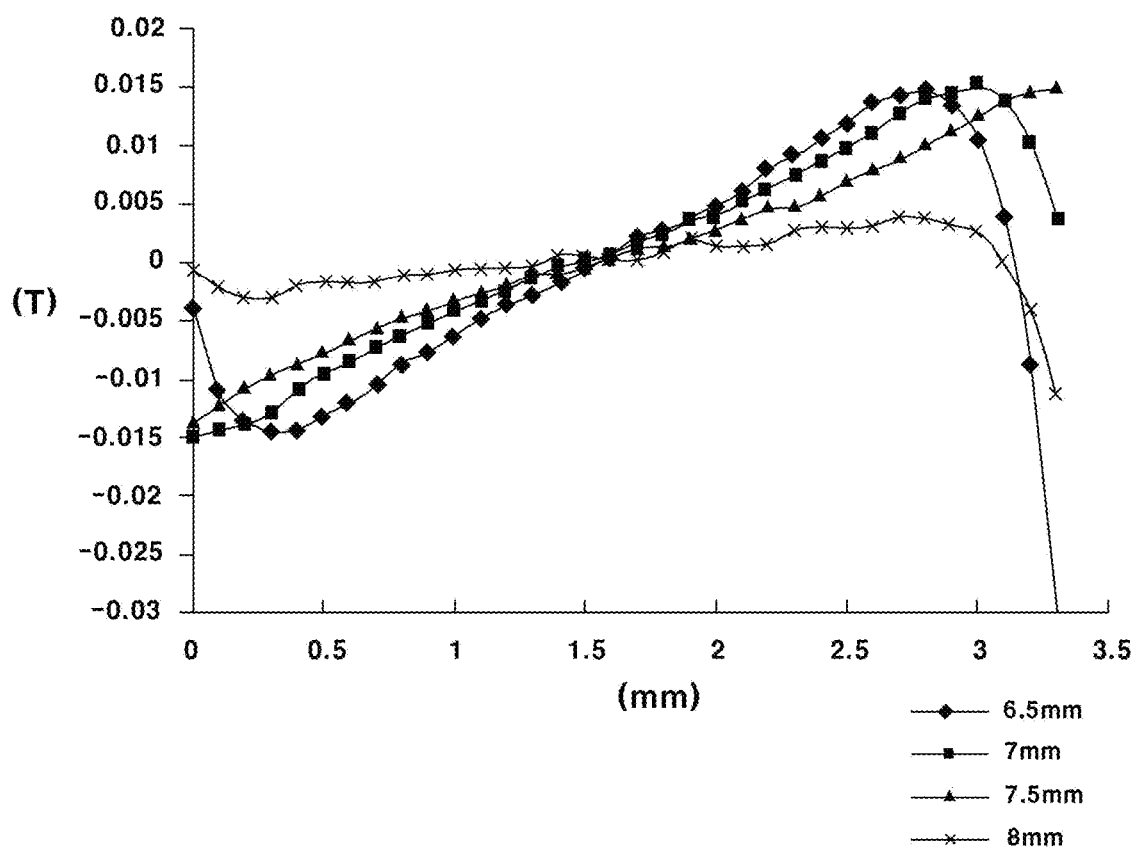
FIG. 7 is a graph showing output values according to the length of a sensor magnet of a camera module according to a first embodiment of the present invention.

FIG. 1 is a perspective view of a camera module according to a first embodiment of the present invention. FIG. 2 is an exploded perspective view of a camera module according to a first embodiment of the present invention. FIG. 3 is a bottom view of some components of a camera module according to a first embodiment of the present invention. FIG. 4 is a front view of some components of a camera module according to a first embodiment of the present invention. FIG. 5 is a graph showing a magnetic flux simulation of a camera module according to a first embodiment of the present invention. FIG. 6 is a graph showing measurement data of a sensor magnet of a camera module according to a first embodiment of the present invention. FIG. 7 is a graph showing output values according to the length of a sensor magnet of a camera module according to a first embodiment of the present invention.

Referring to FIGS. 1 to 4, a camera module 10 according to a first embodiment of the present invention may comprise a housing 100, a lens assembly 200, a guide unit 300, and a first driving unit 400, a second driving unit 500, a substrate 600, a sensor magnet 700, and a sensor 800, but it may be implemented except for some of these components, but does not rule out additional components other than those.

The camera module 10 may comprise a housing 100. The housing 100 may form a transfer tube of the camera module 10. The housing 100 may have a hexahedral shape in which the inside is being exposed. Front and rear surfaces of the housing 100 may be open toward the outside. At least a portion of the side surface of the housing 100 may be open toward the outside. A lens assembly 200, a guide unit 300, a first driving unit 400, a second driving unit 500, a substrate 600, a sensor magnet 700, and a sensor 800 may be disposed in the housing 100.

The camera module 10 may comprise a lens assembly 200. The lens assembly 200 may be disposed in the housing 100. The lens assembly 200 may move in the optical axis direction by electromagnetic interaction between the first driving unit 400 and the second driving unit 500. Here, the optical axis direction may mean the optical axis direction of lenses disposed in the lens assembly 200.

The lens assembly 200 may comprise a first lens assembly 210. The first lens assembly 210 may be disposed inside the housing 100. The first lens assembly 210 may be aligned with second and third lens assemblies 220 and 230. The first lens assembly 210 may be disposed between the second lens assembly 220 and the third lens assembly 230. The first lens assembly 210 may move in the optical axis direction by electromagnetic interaction between the first-first driving unit 420 and the second-first driving unit 520. The movement of the first lens assembly 210 in the optical axis direction may be guided by a first guide unit 320.

The first lens assembly 210 may comprise a first lens barrel 212 in which the first lens group is disposed, and a first side surface 214 disposed at one side of the first lens barrel 212. The first lens barrel 212 of the first lens assembly 210 may be formed in a cylindrical shape. The first side surface 214 of the first lens assembly 210 may be formed in a square plate shape. A first-first driving unit 420 may be disposed on the first side surface 214 of the first lens assembly 210. A first protruded part 216 may be formed on the first side surface 214 of the first lens assembly 210 to be protruded outward. The first protruded part 216 of the first side surface 214 of the first lens assembly 210 may be in contact with the first groove of the first guide unit 320 to guide movement in the optical axis direction. The length of the first side surface 214 of the first lens assembly 210 in the optical axis direction may be greater than the sum of the first lens barrel 212 in the optical axis direction and the length of a second lens barrel 222 in the optical axis direction.

The lens assembly 200 may comprise a second lens assembly 220. The second lens assembly 220 may be disposed inside the housing. The second lens assembly 220 may be aligned with the first and third lens assemblies 210 and 230. The second lens assembly 220 may be disposed at the rear direction of the first lens assembly 210. The second lens assembly 220 may move in the optical axis direction by electromagnetic interaction between a first-second driving unit 410 and a second-second driving unit 510. The movement of the second lens assembly 220 in the optical axis direction may be guided by a second guide unit 310.

The second lens assembly 220 may comprise a second lens barrel 222 in which the second lens group is disposed, and a second side surface 224 disposed at the other side of the second lens barrel 222. The second lens barrel 222 of the second lens assembly 220 may be formed in a cylindrical shape. The second side surface 224 of the second lens assembly 220 may be formed in a square plate shape. A first-second driving unit 310 may be disposed on the second side surface 224 of the second lens assembly 220. The second side surface 224 of the second lens assembly 220 may have a second protruded part being protruded outward. The second protruded part of the second side surface 224 of the second lens assembly 220 may be in contact with the second groove 312 of the second guide unit 310 to guide movement in the optical axis direction. Since the first side surface 214 of the first lens assembly 210 and the second side surface 224 of the second lens assembly 220 are disposed at the directions opposite from each other, space efficiency may be improved. The length of the second side surface 224 of the second lens assembly 220 in the optical axis direction may be greater than the sum of the length of the first lens barrel 212 in the optical axis direction and the length of the second lens barrel 222 in the optical axis direction.

The lens assembly 200 may comprise a third lens assembly 230. The third lens assembly 230 may be disposed in the housing 100. The third lens assembly 230 may be coupled to the housing 100. The third lens assembly 230 may be coupled to the front side of the housing. The third lens assembly 230 may be disposed in front of the first lens assembly 210. The third lens assembly 230 may comprise a third lens group. The optical axis of the third lens group of the third lens assembly 230 may be aligned with the first and second lens groups. In a first embodiment of the present invention, the third lens assembly 230 is fixed to the housing 100, and first and second lens assemblies 210 and 220 may respectively move in the optical axis direction to implement a zooming function.

The camera module 10 may comprise a guide unit 300. The guide unit 300 may be disposed in the housing 100. The guide unit 300 may be integrally formed with the housing 100. The guide unit 300 may be separately manufactured and assembled to the housing 100. The guide unit 300 may guide movement of the first and second lens assemblies 210 and 220 in the optical axis direction. A second driving unit 500 may be disposed in the guide unit 300.

The guide unit 300 may comprise a first guide unit 320. The first guide unit 320 may be disposed in the housing 100. The first guide unit 320 may be fixed to the housing 100. The first guide unit 320 may be integrally formed with the housing 100. The first guide unit 320 may be disposed at one side of the first and second lens assemblies 210 and 220. The first guide unit 320 may comprise a first groove. The first groove of the first guide unit 320 may be in contact with the first protruded part 216 of the first side surface 214 of the first lens assembly 210 to guide the movement of the first lens assembly 210 in the optical axis direction. A second-first driving unit 520 may be disposed in the first guide unit 320.

The guide unit 300 may comprise a second guide unit 310. The second guide unit 310 may be disposed in the housing 100. The second guide unit 310 may be fixed to the housing 100. The second guide unit 310 may be integrally formed with the housing 100. The second guide unit 310 may be disposed at the other side of the first and second lens assemblies 210 and 220. The second guide unit 310 may comprise a second groove 312. The second groove 312 of the second guide unit 310 comes into contact with the second protruded part of the second side surface 224 of the second lens assembly 220 so that it may guide the movement of the second lens assembly 220 in the optical axis direction. A second-second driving unit 510 may be disposed in the second guide unit 310.

The camera module 10 may comprise a first driving unit 400. The first driving unit 400 may be disposed in the lens assembly 200. The first driving unit 400 may be disposed in the first and second lens assemblies 210 and 220. The first driving unit 400 may comprise a magnet. The first driving unit 400 may face the second driving unit 500. The first driving unit 400 may move the first lens assembly 210 and the second lens assembly 220 in the optical axis direction through electromagnetic interaction with the second driving unit 500.

The first driving unit 400 may comprise a first-first driving unit 420. The first-first driving unit 420 may be disposed in the first lens assembly 210. The first-first driving unit 420 may be disposed on the first side surface 214 of the first lens assembly 210. The front side of the first-first driving unit 420 may be magnetized in a first polarity and the rear side thereof may be magnetized in a second polarity. The first-first driving unit 420 may be formed in a hexahedral shape. The first-first driving unit 420 may be disposed at a position facing the second-first driving unit 520. The first-first driving unit 420 may move the first lens assembly 210 in the optical axis direction through electromagnetic interaction with the second-first driving unit 520.

The first driving unit 400 may comprise a first-second driving unit 410. The first-second driving unit 410 may be disposed in the second lens assembly 220. The first-second driving unit 410 may be disposed on the second side surface 224 of the second lens assembly 220. The front side of the first-second driving unit 410 may be magnetized in a first polarity and the rear side of the first-second driving unit 410 may be magnetized in a second polarity. The first-second driving unit 410 may be formed in a hexahedral shape. The first-second driving unit 410 may be disposed at a position facing the second-second driving unit 510. The first-second driving unit 410 may move the second lens assembly 220 in the optical axis direction through electromagnetic interaction with the second-second driving unit 510.

The camera module 10 may comprise first yokes 430 and 440. The first yokes 430 and 440 may be disposed between the first driving unit 400 and the first and second lens assemblies 210 and 220. The first yokes 430 and 440 may inhibit the magnetic field of the first driving unit 400 from leaking.

The first yokes 430 and 440 may comprise a first-first yoke 440. The first-first yoke 440 may be disposed between the first lens assembly 210 and the first-first driving unit 420. The first-first yoke 440 may be disposed in the first lens assembly 210. The first-first yoke 440 may be coupled to the first side surface 214 of the first lens assembly 210. The first-first yoke 440 may be snap-fit coupled to the first side surface 214 of the first lens assembly 210. The first-first yoke 440 may surround at least two surfaces of the first-first driving unit 420. Through this, the first-first yoke 440 may inhibit the magnetic field of the first-first driving unit 420 from leaking.

The first yokes 430 and 440 may comprise a first-second yoke 430. The first-second yoke 430 may be disposed between the second lens assembly 220 and the first-second driving unit 410. The first-second yoke 430 may be disposed in the second lens assembly 220. The first-second yoke 430 may be coupled to the second side surface 224 of the second lens assembly 220. The first-second yoke 430 may be snap-fit coupled to the second side surface 224 of the second lens assembly 220. The first-second yoke 430 may surround at least two surfaces of the first-second driving unit 410. Through this, the first-second yoke 430 may inhibit the magnetic field of the first-second driving unit 410 from leaking.

The camera module 10 may comprise a second driving unit 500. The second driving unit 500 may be disposed in the housing 100. The second driving unit 500 may be disposed in the guide unit 300. The second driving unit 500 may comprise a coil. The second driving unit 500 may be coupled to the substrate 600. The second driving unit 500 may receive current from the substrate 600. The second driving unit 500 may face the first driving unit 400. The second driving unit 500 may move the first lens assembly 210 and the second lens assembly 220 in the optical axis direction through electromagnetic interaction with the first driving unit 400.

The second driving unit 500 may comprise a second-first driving unit 520. The second-first driving unit 520 may be disposed in the first guide unit 320. The second-first driving unit 520 may be coupled to the first guide unit 320. The second-first driving unit 520 may be coupled to the substrate 600. The second-first driving unit 520 may be electrically connected to the substrate 600. The second-first driving unit 520 may be formed in a '☐' shape. The second-first driving unit 520 may comprise a coil. The second-first driving unit 520 may face the first-first driving unit 420. When a current is supplied to the second-first driving unit 520, the second-first driving unit 520 may electromagnetically interact with the first-first driving unit 420.

The second driving unit 500 may comprise a second-second driving unit 510. The second-second driving unit 510 may be disposed in the second guide unit 310. The second-second driving unit 510 may be coupled to the second guide unit 310. The second-second driving unit 510 may be coupled to the substrate 600. The second-second driving unit 510 may be electrically connected to the substrate 600. The second-second driving unit 510 may be formed in a '☐' shape. The second-second driving unit 510 may comprise a coil. The second-second driving unit 510 may face the first-second driving unit 410. When a current is supplied to the second-second driving unit 510, the second-second driving unit 510 may electromagnetically interact with the first-second driving unit 410.

The camera module 10 may comprise second yokes 530 and 540. The second yokes 530 and 540 may be disposed outside the second driving unit 500. The second yokes 530 and 540 may be coupled to the substrate 600. The second yokes 530 and 540 may be snap-fit coupled to the substrate 600. The second yokes 530 and 540 may inhibit leakage of the electric field of the second driving unit 500.

The second yokes 530 and 540 may comprise a second-first yoke 540. The second-first yoke 540 may be coupled to the substrate 600. The second-first yoke 540 may surround the outer side of the second-first driving unit 520. Through this, the second-first yoke 540 may inhibit leakage of the electric field of the second-first driving unit 520.

The second yokes 530 and 540 may comprise a second-second yoke 530. The second-second yoke 530 may be coupled to the substrate 600. The second-second yoke 530 may surround the outer side of the second-second driving unit 510. Through this, the second-second yoke 530 may inhibit leakage of the electric field of the second-second driving unit 510.

The camera module 10 may comprise a substrate 600. The substrate 600 may be disposed in the housing 100. The second driving unit 500 and the second yokes 530 and 540 may be coupled to the substrate 600. A sensor 800 may be disposed in the substrate 600. The substrate 600 may be electrically connected to the second driving unit 500 and the sensor 800 to supply current. The substrate 600 may comprise a printed circuit board (PCB). The substrate 600 may comprise a flexible printed circuit board (FPCB).

The camera module 10 may comprise a sensor magnet 700. The sensor magnet 700 may be disposed in the lens assembly 200. The sensor magnet 700 may be disposed in the first and second lens assemblies 210 and 220. The sensor magnet 700 may be formed to be extended in the optical axis direction. The sensor magnet 700 may be overlapped with the first and second lens assemblies 210 and 220 in a first direction perpendicular to the optical axis direction and in the optical axis direction and a second direction perpendicular to the first direction. The distance between the sensor magnet 700 and the center of the lens assembly 200 may be shorter than the distance between the first driving unit 400 and the center of the lens assembly 200. Here, the center of the lens assembly 200 may mean a central region of the first lens barrel 212 and/or a central region of the second lens barrel 222.

The sensor magnet 700 may face the Hall sensor 800. The length of the sensor magnet 700 in the optical axis direction may be greater than stroke movement of the first and second lens assemblies 210 and 220 in the optical axis direction. The length of the sensor magnet 700 in the optical axis direction may correspond to the sum of the distances of the first sensors 812 and 822 and the second sensors 814 and 824 and the stroke movement of the first and second lens assemblies 210 and 220 in the optical axis direction. Specifically, the length of the sensor magnet 700 in the optical axis direction may have a length within the range of 5% of the sum of the distances of the first sensors 812 and 822 and the second sensors 814 and 824, and the stroke movement of the first and second lens assemblies 210 and 220 in the optical axis direction. Through this, the detection rate of the sensor magnet 700 may be enhanced. In a first embodiment of the present invention, a movement stroke of the first and second lens assemblies 210 and 220 may mean a movement distance of the first and second lens assemblies 210 and 220 in the optical axis direction.

The sensor magnet 700 may comprise a first sensor magnet 720. The first sensor magnet 720 may be disposed in the first lens assembly 210. The first sensor magnet 720 may be spaced apart from the second sensor magnet 710 in a first direction perpendicular to the optical axis direction. The first sensor magnet 720 may have a length corresponding to that of the second sensor magnet 710. The first sensor magnet 720 may be disposed in a space between the first lens barrel 212 and the first side surface 214. Through this, space efficiency can be enhanced. The distance between the first sensor magnet 720 and the central region of the first lens barrel 212 may be shorter than the distance between the first-first driving unit 420 and the central region of the first lens barrel 212. The first sensor magnet 720 may face the plurality of sensors 820. Specifically, the first sensor magnet 720 may face the first-first sensor 822 and the second-first sensor 824.

The sensor magnet 700 may comprise a second sensor magnet 710. The second sensor magnet 710 may be disposed in the second lens assembly 220. The second sensor magnet 710 may be spaced apart from the first sensor magnet 720 in a first direction perpendicular to the optical axis direction. The second sensor magnet 710 may have a length corresponding to that of the first sensor magnet 720. The second sensor magnet 710 may be disposed between the second lens barrel 222 and the second side surface 224. Through this, space efficiency can be enhanced. The distance between the second sensor magnet 710 and the central region of the second lens barrel 222 may be shorter than the distance between the first-second driving unit 410 and the central region of the second lens barrel 222. The second sensor magnet 710 may face the plurality of sensors 810. Specifically, the second sensor magnet 710 may face the first-second sensor 812 and the second-second sensor 814.

The camera module 10 may comprise third yokes 730 and 740. The third yokes 730 and 740 may be disposed between the sensor magnet 700 and the first and second lens assemblies 210 and 220. The third yokes 730 and 740 may be formed to be extended in the optical axis direction. A cross section of the third yokes 730 and 740 may be formed in a shape. The third yokes 730 and 740 may surround three surfaces of the sensor magnet 700. Specifically, the third yokes 730 and 740 may surround surfaces of the sensor magnet 700, except for the surface facing the sensor 800. Through this, leakage of the magnetic field of the sensor magnet 700 may be inhibited, and the sensor magnet 700 may be inhibited from interfering with the electromagnetic interaction of the first and second driving units 400 and 500.

The third yokes 730 and 740 may comprise a third-first yoke 740. The third-first yoke 740 may be disposed between the first lens assembly 210 and the first sensor magnet 720. The third-first yoke 740 may be disposed in a space between the first lens barrel 212 and the first side surface 214. The third-first yoke 740 may surround three surfaces of the first sensor magnet 720. Through this, it is possible to reduce the magnetic field leakage of the first sensor magnet 720 and inhibit interference with the first and second driving units 400 and 500.

The third yokes 730 and 740 may comprise a third-second yoke 730. The third-second yoke 730 may be disposed between the second lens assembly 220 and the second sensor magnet 710. The third-second yoke 730 may be disposed in a space between the second lens barrel 222 and the second side surface 224. The third-second yoke 730 may surround three surfaces of the second sensor magnet 710. Through this, it is possible to reduce the magnetic field leakage of the second sensor magnet 710 and inhibit interference with the first and second driving units 400 and 500.

The camera module 10 may comprise a sensor 800. The sensor 800 may be disposed in the housing 100. The sensor 800 may be disposed in the substrate 600. The sensor 800 may be electrically connected to the substrate 600. The sensor 800 may face the sensor magnet 700. The sensor 800 may comprise a Hall sensor that detects the sensor magnet 700. The sensor 800 may comprise a plurality of sensors 810 and 820.

The sensor 800 may comprise first sensors 822 and 812. The first sensors 822 and 812 may be spaced apart from the second sensors 824 and 814 in the optical axis direction. The first sensors 822 and 812 may comprise a first-first sensor 822 and a first-second sensor 812 spaced apart from the first-first sensor 822 in a direction perpendicular to the optical axis.

The sensor 800 may comprise second sensors 824 and 814. The second sensors 824 and 814 may be spaced apart from the first sensors 822 and 812 in the optical axis direction. The second sensors 824 and 814 may comprise a second-first sensor 824 and a second-second sensor 814 spaced apart from the second-first sensor 824 in a direction perpendicular to the optical axis.

The first-first sensor 822 and the second-first sensor 824 may face the first sensor magnet 720. The first-first sensor 822 and the second-first sensor 824 may detect the first sensor magnet 720.

The first-second sensor 812 and the second-second sensor 814 may face the second sensor magnet 710. The first-second sensor 812 and the second-second sensor 814 may detect the second sensor magnet 710.

The sum of the distance between the first sensors 822 and 812 and the second sensors 824 and 814 and the movement strokes of the first and second lens assemblies 210 and 220 may correspond to the length of the sensor magnet 700 in the optical axis direction. A distance between the first sensors 822 and 812 and the second sensors 824 and 814 may be greater than a movement stroke of the first and second lens assemblies 210 and 220.

Referring to FIG. 5, when the output values of the first sensors 822 and 812 are A and the output values of the second sensors 824 and 814 are B, it can be seen that the (A−B)/(A+B) operation has linearity. Through this, it is possible to easily amplify the output value.

Referring to FIG. 6, it can be seen that the measured values of the first sensors 822 and 812 and the second sensors 824 and 814 of the sensor magnet 700 occur between 0.5 mm and 8.5 mm. That is, when the length of the sensor magnet 700 in the optical axis direction is out of about 7.5 mm, the measured values of the first sensors 822 and 812 and the second sensors 824 and 814 are meaningless due to a sharp decrease in magnetic force. Therefore, when the length of the sensor magnet 700 in the optical axis direction is about 7.5 mm, the measurement efficiency of the first sensors 822 and 812 and the second sensors 824 and 814 can be increased.

Referring to FIG. 7, when the length of the sensor magnet 700 in the optical axis direction is about 7.5 mm and the stroke of the sensor magnet 700 is about 3 mm, it can be seen that the maximum efficiency is maintained only when the distance between the first sensors 822 and 812 and the second sensors 824 and 814 is about 4.5 mm. Therefore, the length of the sensor magnet 700 in the optical axis direction is preferred to have a length within the range of 5% of the sum of the distance of the first sensors 812 and 822 and the second sensors 814 and 824 and the movement strokes of the first and second lens assemblies 210 and 220 in the optical axis direction. Through this, the detection rate of the sensor magnet 700 may be enhanced.

Hereinafter, a second embodiment of the present invention will be described in more detail with reference to the accompanying drawings.

Figure 8:
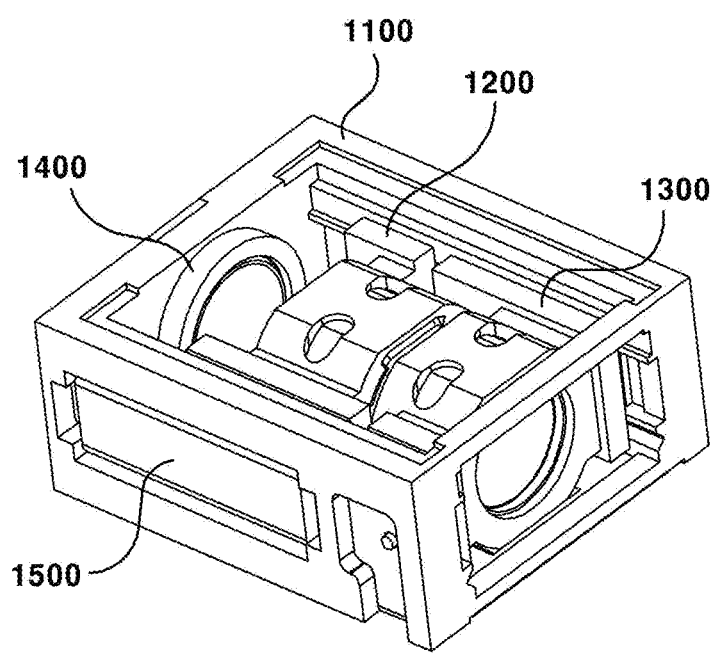
FIG. 8 is a perspective view of a camera module according to a second embodiment of the present invention.
Figure 9:
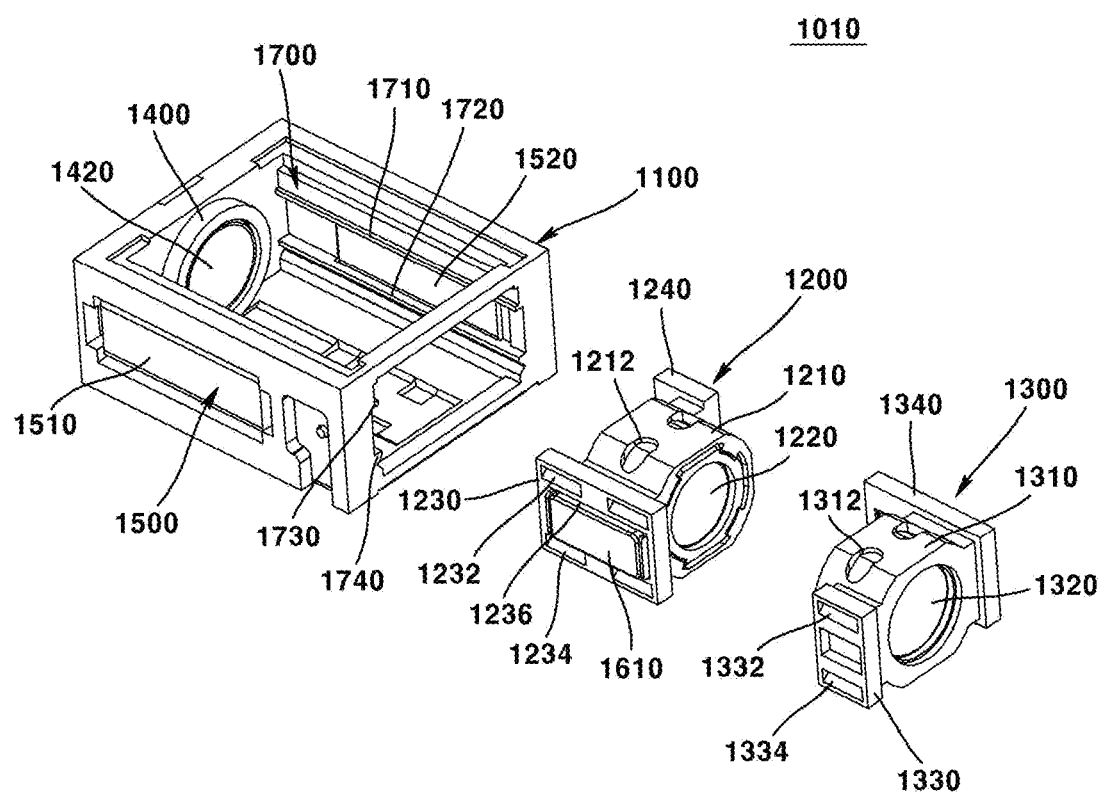
FIG. 9 is an exploded perspective view of a camera module according to a second embodiment of the present invention.
Figure 10:
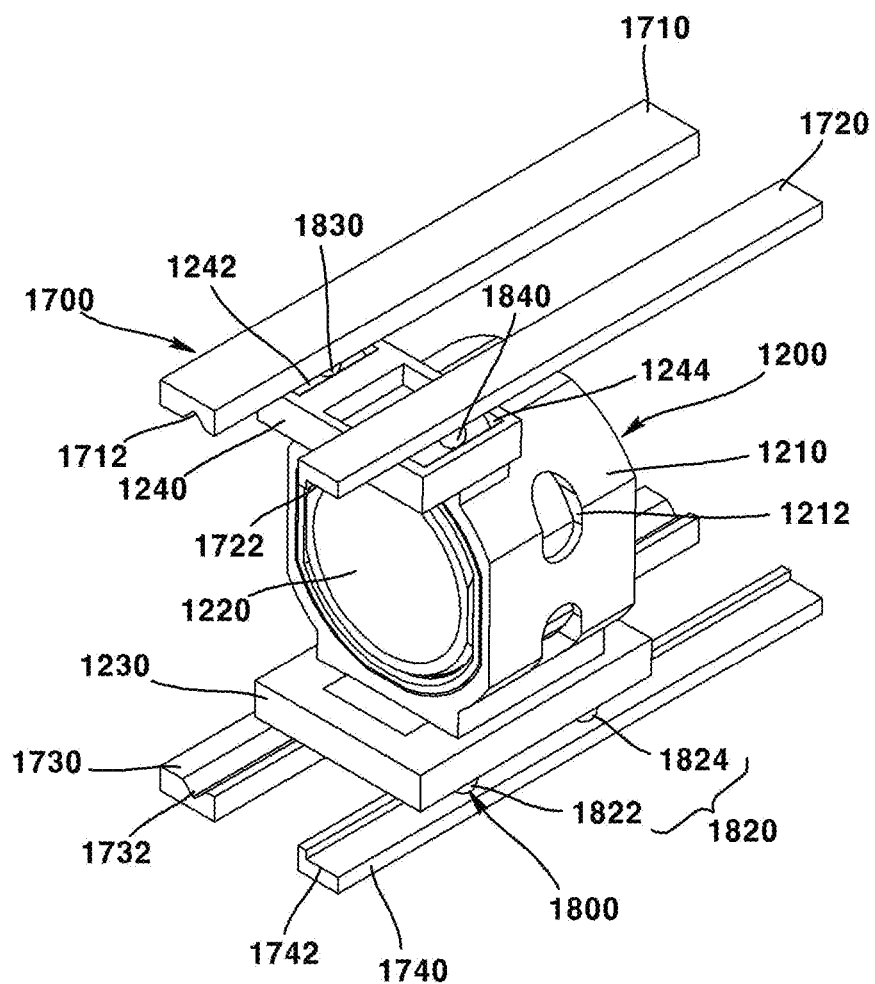
FIGS. 10 and 11 are perspective views of some components of a camera module according to a second embodiment of the present invention.
Figure 11:
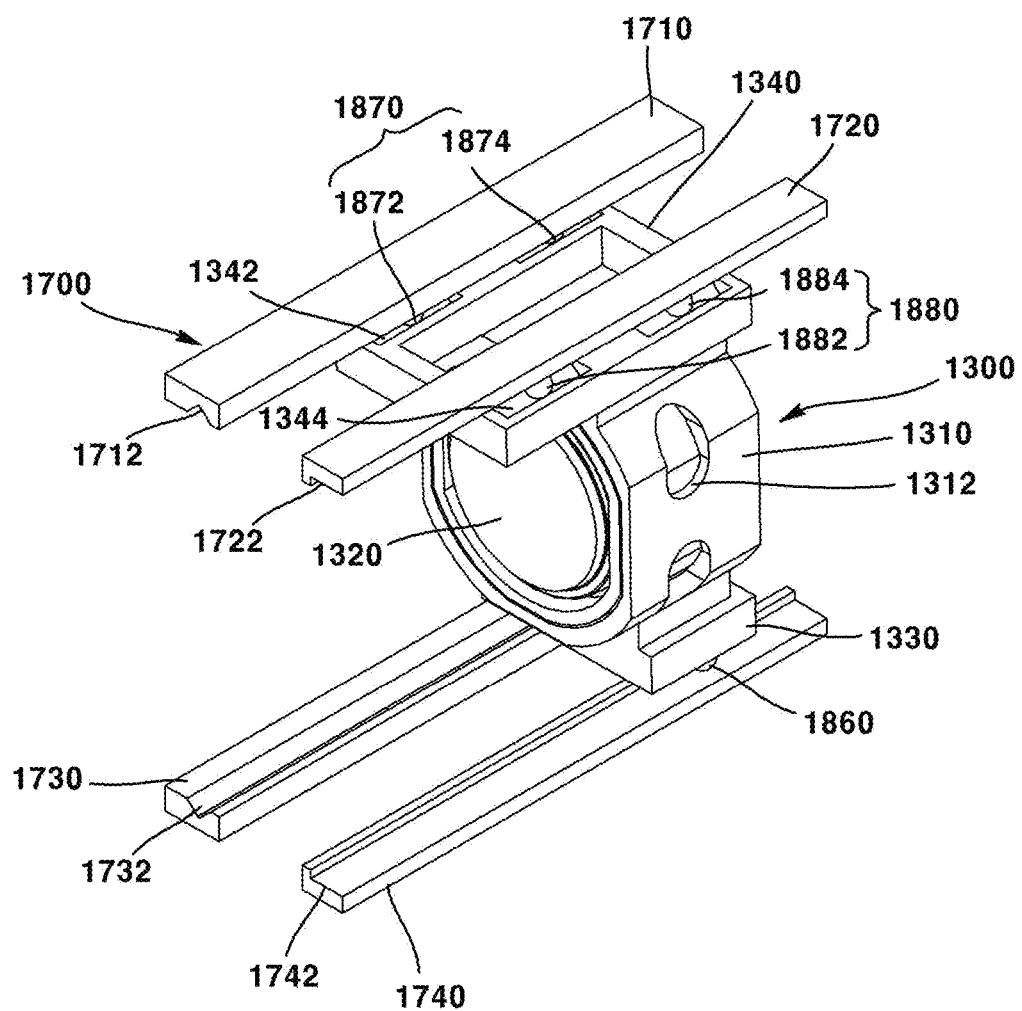
Figure 12:
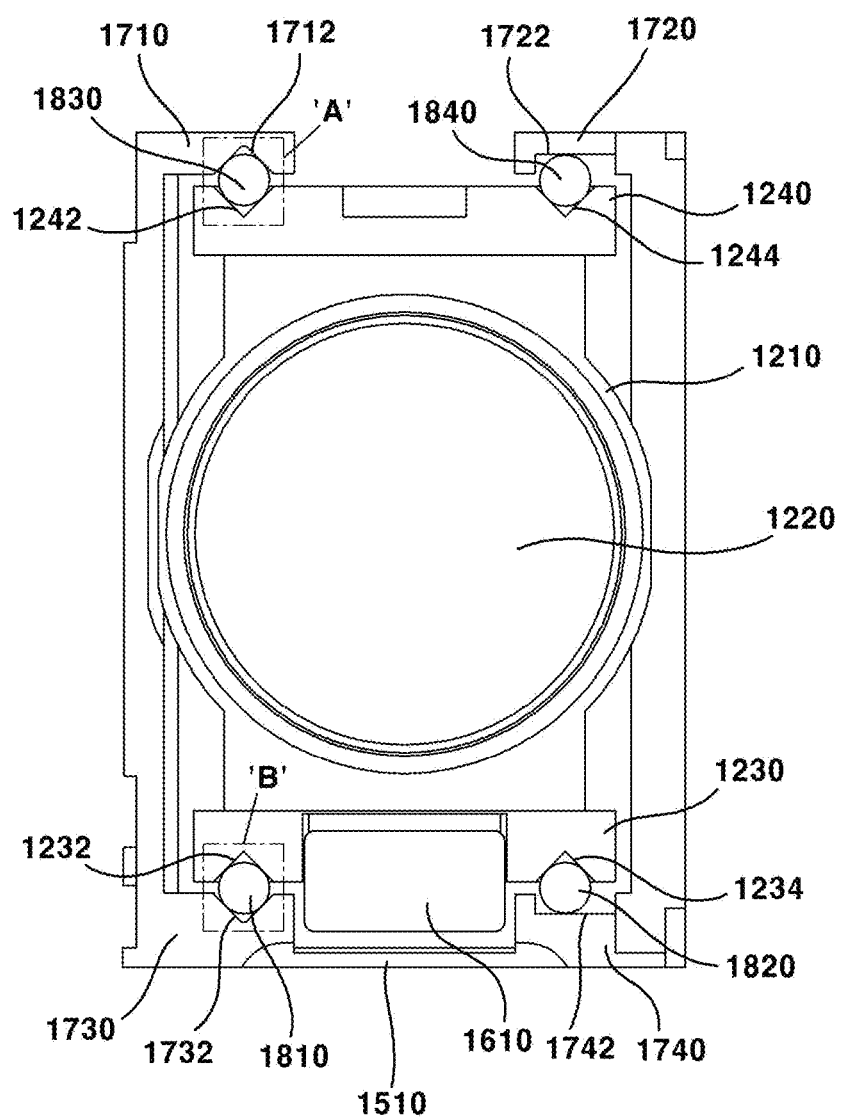
FIG. 12 is a cross-sectional view of some components of a camera module according to a second embodiment of the present invention.
Figure 13:
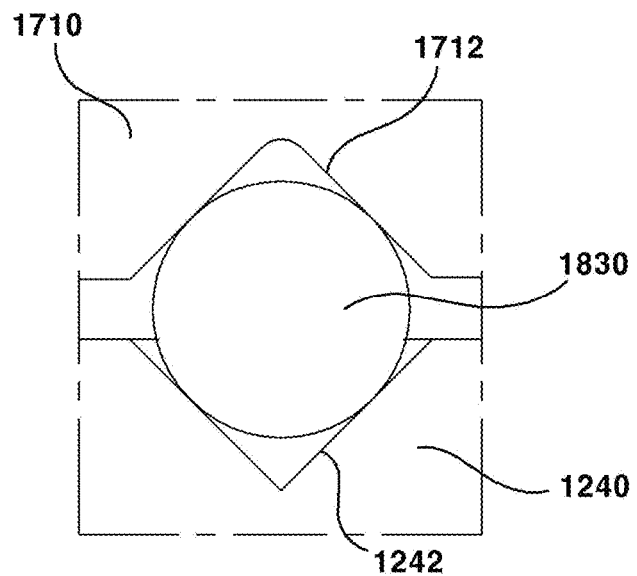
FIG. 13 is an enlarged view of part A of FIG. 12.
Figure 14:
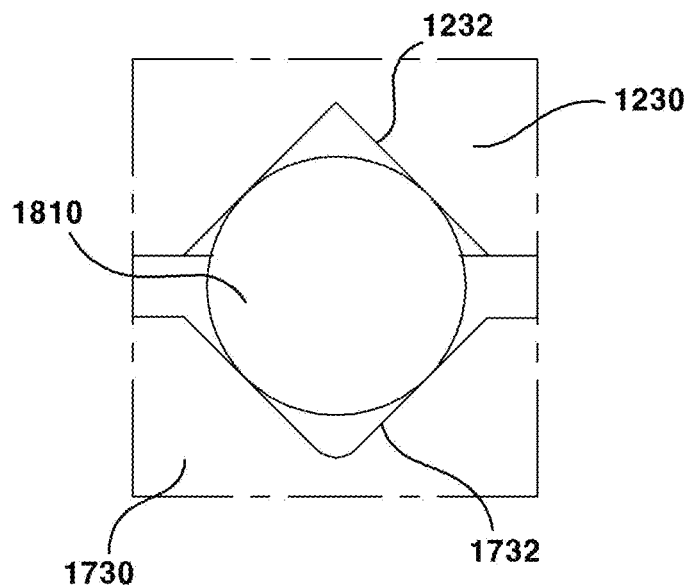
FIG. 14 is an enlarged view of part B of FIG. 12.
Figure 15:
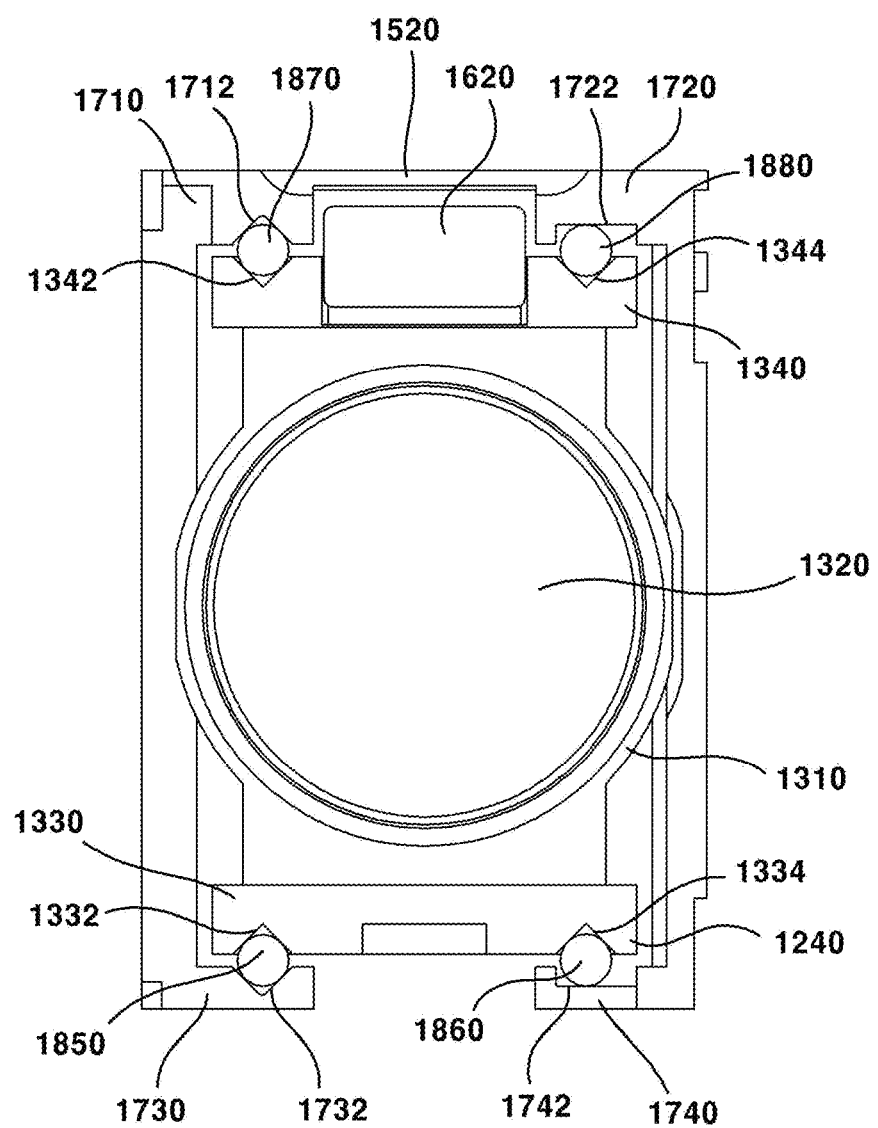
FIGS. 15 and 16 are cross-sectional views of some components of a camera module according to a second embodiment of the present invention.
Figure 16:
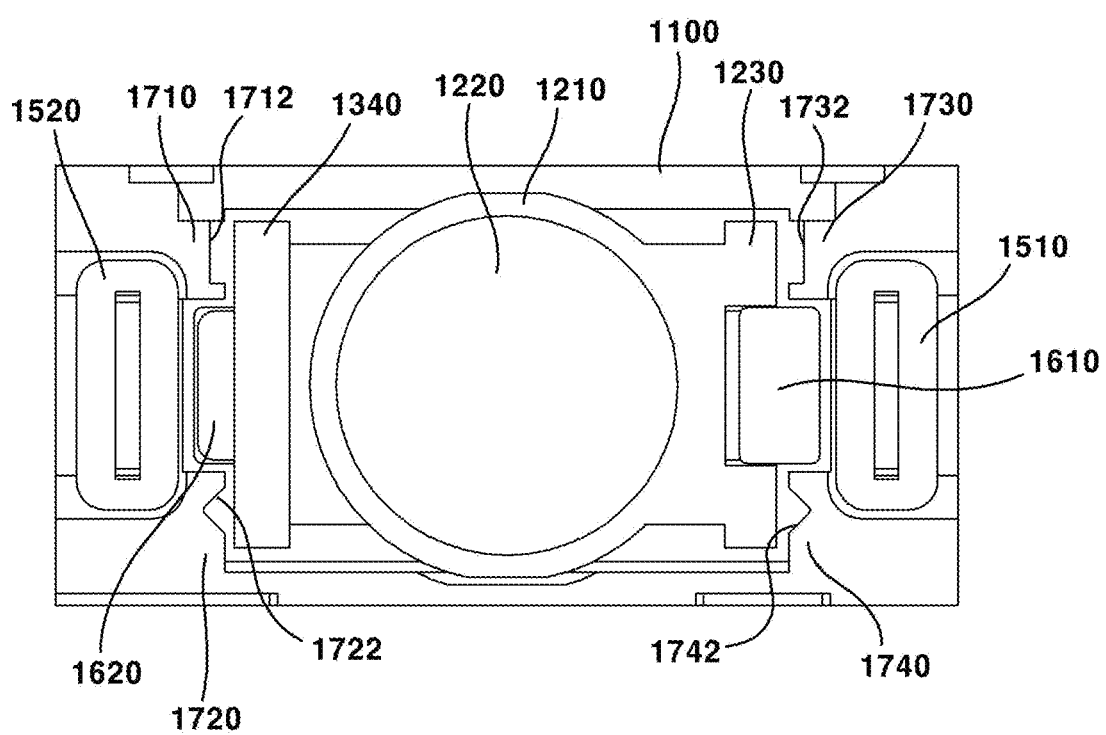
Figure 17:
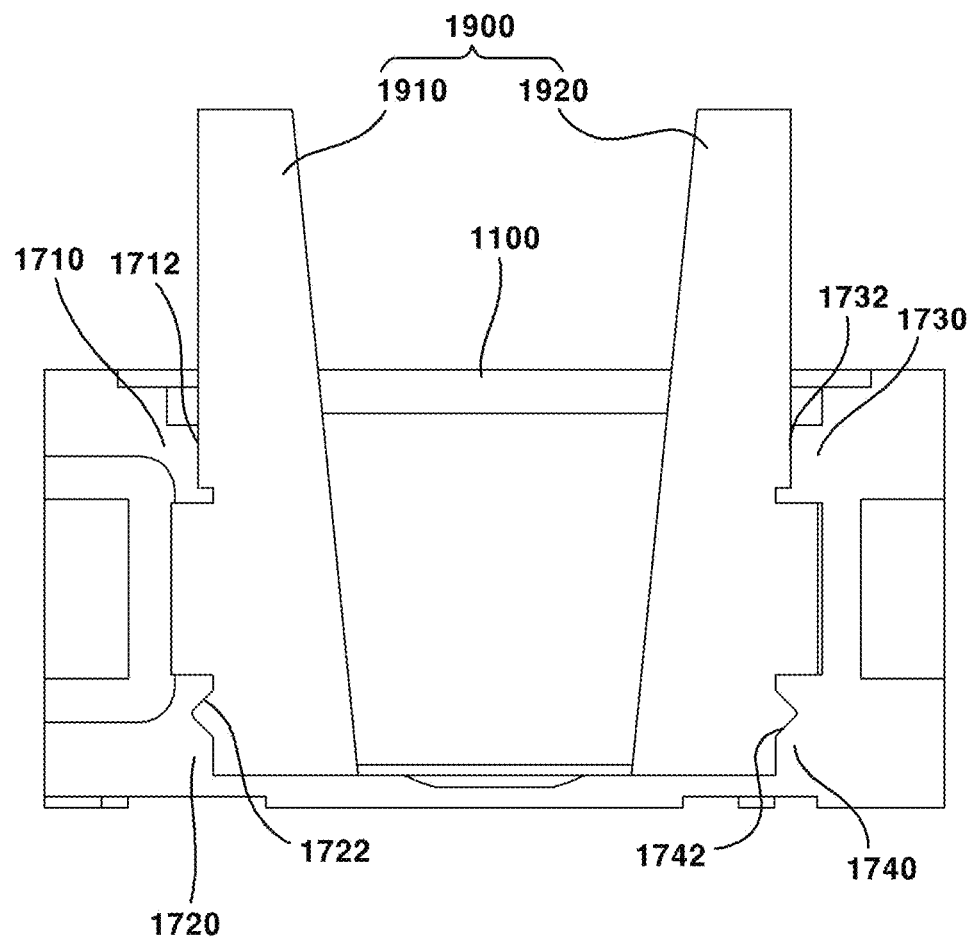
FIG. 17 is a molding operation diagram of some components of a camera module according to a second embodiment of the present invention.
Figure 18:
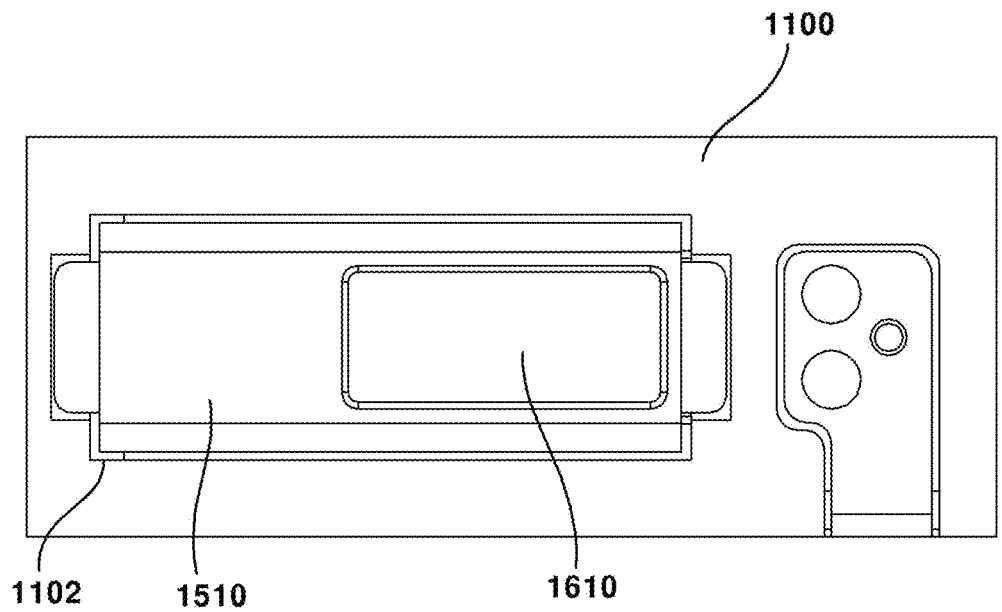
FIGS. 18 and 19 are operation diagrams of some components of a camera module according to a second embodiment of the present invention.
Figure 19:
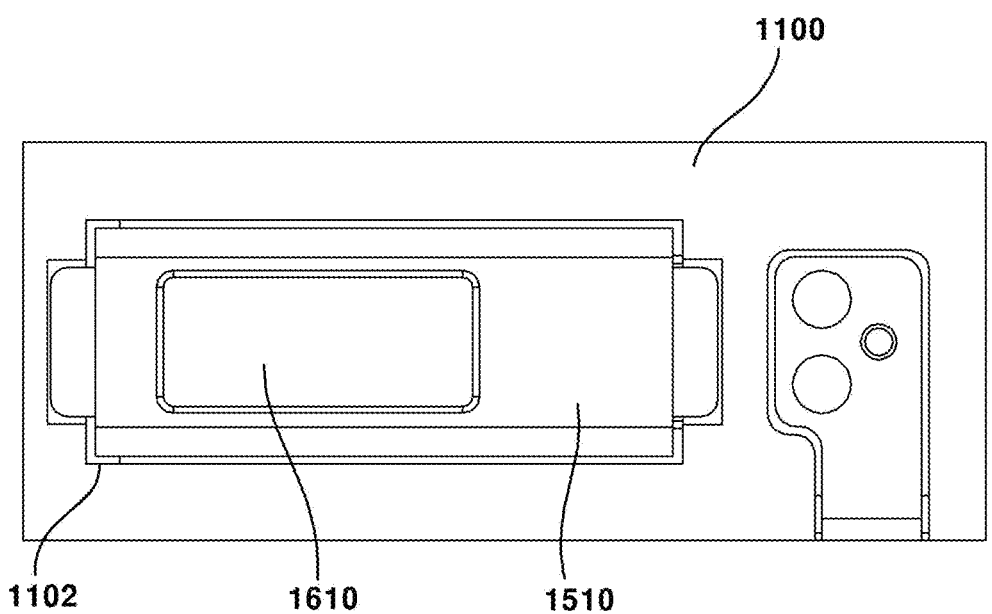
Figure 20:
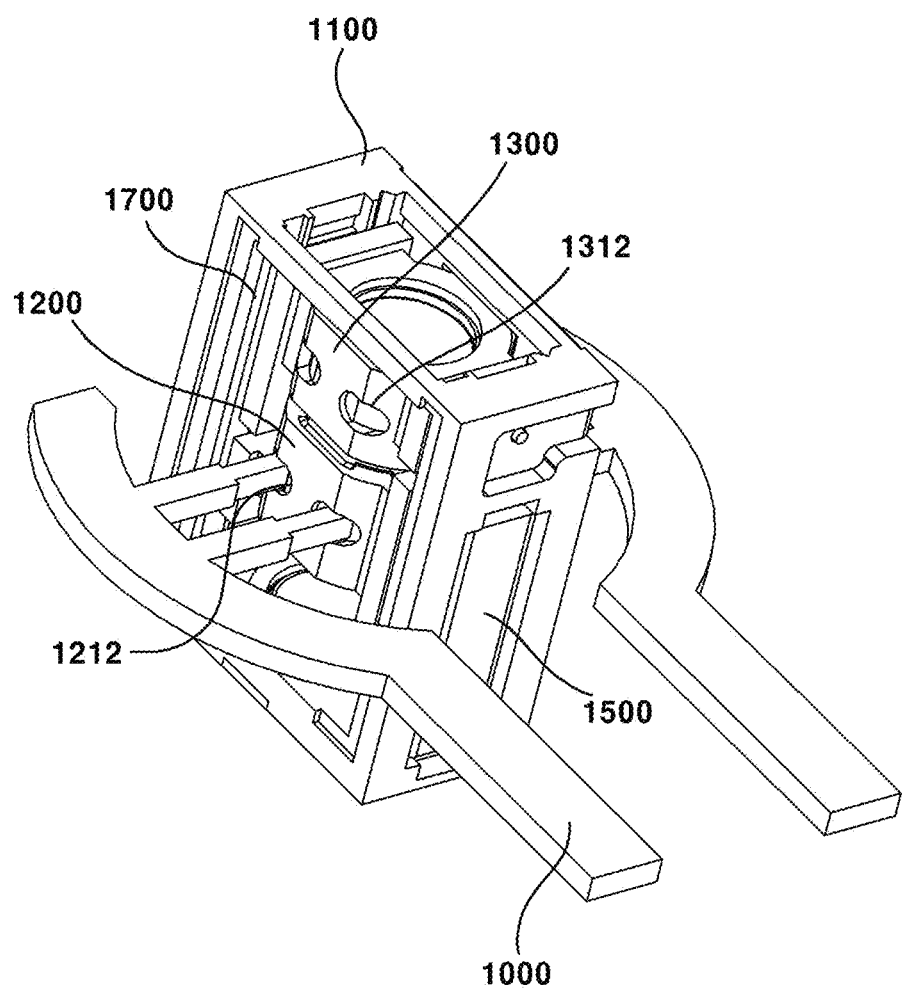
FIG. 20 is a view showing an alignment operation of a camera module according to a second embodiment of the present invention.

FIG. 8 is a perspective view of a camera module according to a second embodiment of the present invention. FIG. 9 is an exploded perspective view of a camera module according to a second embodiment of the present invention. FIGS. 10 and 11 are perspective views of some components of a camera module according to a second embodiment of the present invention. FIG. 12 is a cross-sectional view of some components of a camera module according to a second embodiment of the present invention. FIG. 13 is an enlarged view of part A of FIG. 12. FIG. 14 is an enlarged view of part B of FIG. 12. FIGS. 15 and 16 are cross-sectional views of some components of a camera module according to a second embodiment of the present invention. FIG. 17 is a molding operation diagram of some components of a camera module according to a second embodiment of the present invention. FIGS. 18 and 19 are operation diagrams of some components of a camera module according to a second embodiment of the present invention. FIG. 20 is a view showing an alignment operation of a camera module according to a second embodiment of the present invention.

Referring to FIGS. 8 to 20, a camera module 1010 according to a second embodiment of the present invention may comprise a housing 1100, a first lens assembly 1200, a second lens assembly 1300, and a third a lens assembly 1400, a first driving unit 1510, a second driving unit 1520, a third driving unit 1610, a fourth driving unit 1620, and a guide unit 1700, but it may be implemented except for some of these components, and does not exclude additional components other than these.

The camera module 1010 according to a second embodiment of the present invention may comprise a lens assembly driving device. The lens assembly driving device may comprise a housing 1100, a first lens assembly 1200, a second lens assembly 1300, a third lens assembly 1400, a first driving unit 1510, and a second driving unit 1520, a third driving unit 1610, a fourth driving unit 1620, and a guide unit 1700, and does not exclude additional components other than these.

The camera module 1010 may comprise a housing 1100. The housing 1100 may form the outer appearance of the camera module 1010. The housing 1100 may be formed in a hexahedral shape in which the inside is exposed. In the housing 1100, a first lens assembly 1200, a second lens assembly 1300, a third lens assembly 1400, a first driving unit 1510, a second driving unit 1520, a third driving unit 1610, a fourth driving unit 1620, and a guide unit 1700 may be disposed. A substrate (not shown) electrically connected to at least one of the first to fourth driving units 1500 and 1600 to supply current may be disposed in the housing 1100.

At least one surface of the housing 1100 may be opened. Even after at least one surface of the housing 1100 is opened and the first lens assembly 1200, the second lens assembly 1300, and the third lens assembly 1400 are assembled to the housing 1100, an operation of at least one of the first lens assembly 1200 and the second lens assembly 1300 can be checked with the naked eye. For example, an upper surface and a lower surface of the housing are opened, so that the first lens assembly 1200 and the second lens assembly 1300 can be exposed toward the outside.

The camera module 1010 may comprise a first lens assembly 1200. The first lens assembly 1200 may be disposed in the housing 1100. The first lens assembly 1200 may be disposed between the second lens assembly 1300 and the third lens assembly 1400. The first lens assembly 1200 may comprise a first lens barrel 1210, a first lens group 1220, a first side surface 1230, and a second side surface 1240.

The first lens assembly 1200 may comprise a first lens barrel 1210. The first lens barrel 1210 may be formed in a cylindrical shape. The first lens barrel 1210 may comprise an accommodating part formed therein. A first lens group 1220 may be disposed in the first lens barrel 1210. A first side surface 1230 and a second side surface 1240 may be extended from the first lens barrel 1210.

The first lens barrel 1210 may comprise a first hole 1212. The first hole 1212 may comprise at least one hole. In a state in which the first lens assembly 1200 is assembled in the housing 1100, the first lens assembly 1200 may be aligned through the alignment mechanism 11000 through the upper and lower surfaces of the housing 1100 and the first hole 1212.

The first lens assembly 1200 may comprise a first lens group 1220. The first lens group 1220 may be disposed in the first lens barrel 1210. The first lens group 1220 may be disposed in an accommodating part formed inside the first lens barrel 1210. The first lens group 1220 may be aligned with the second lens group 1320 and the third lens group 1420 in the optical axis direction. The first lens group 1220 may comprise at least one lens.

The first lens assembly 1200 may comprise a first side surface 1230. The first side surface 1230 of the first lens assembly 1200 may be connected to the first lens barrel 1210. The first side surface 1230 of the first lens assembly 1200 may be formed in a rectangular plate shape. The first side surface 1230 of the first lens assembly 1200 may be disposed on one side of the first lens barrel 1210.

The first side surface 1230 of the first lens assembly 1200 may face the first guide units 1730 and 1740. The movement of the first side surface 1230 of the first lens assembly 1200 in the optical axis direction may be guided by the first guide units 1730 and 1740.

The first side surface 1230 of the first lens assembly 1200 may be overlapped with the first side surface 1330 of the second lens assembly 1300 in the optical axis direction. The length of the first side surface 1230 of the first lens assembly 1200 in the optical axis direction may be longer than the length of the first side surface 1330 of the second lens assembly 1300.

A third driving unit 1610 may be disposed on the first side surface 1230 of the first lens assembly 1200. The first side surface 1230 of the first lens assembly 1200 may comprise a groove 1236 in which the third driving unit 1610 is disposed. The first side surface 1230 of the first lens assembly 1200 may face the first driving unit 1510.

The first side surface 1230 of the first lens assembly 1200 may comprise third grooves 1232 and 1234. The third grooves 1232 and 1234 may face the first guide units 1730 and 1740. The third grooves 1232 and 1234 may face the first grooves 1732 and 1742 of the first guide units 1730 and 1740. The third grooves 1232 and 1234 may be formed in a 'V' shape. The third grooves 1232 and 1234 may be in contact with the first guide balls 1810 and 1820. The third grooves 1232 and 1234 may be in contact with the first guide balls 1810 and 1820 at two points.

The third grooves 1232 and 1234 may comprise a third-first groove 1232 and a third-second groove 1234. The third-first groove 1232 and the third-second groove 1234 may be spaced apart from each other in a direction perpendicular to the optical axis direction. The third-first groove 1232 and the third-second groove 1234 may be formed to have shapes and sizes corresponding to each other. The third-first groove 1232 may face the first-first groove 1732. The third-second groove 1234 may face the first-second groove 1742. A third driving unit 1610 may be disposed in a space between the third-first groove 1232 and the third-second groove 1234. The third-first groove 1232 may comprise a plurality of third-first grooves 1232 spaced apart from each other in the optical axis direction. The third-second groove 1234 may comprise a plurality of third-second grooves 1234 spaced apart from each other in the optical axis direction. Each of the third-first groove 1232 and the third-second groove 1234 may be formed in a 'V' shape. The third-first groove 1232 may be in contact with the first-first guide ball 1810. The third-first groove 1232 may be in contact with the first-first guide ball 1810 at two points. The third-second groove 1234 may be in contact with the first-second guide ball 1820. The third-second groove 1234 may be in contact with the first-second guide ball 1820 at two points.

The first lens assembly 1200 may comprise a second side surface 1240. The second side surface 1240 of the first lens assembly 1200 may be connected to the first lens barrel 1210. The second side surface 1240 of the first lens assembly 1200 may be formed in a rectangular plate shape. The second side surface 1240 of the first lens assembly 1200 may be disposed at the other side of the first lens barrel 1210. That is, the second side surface 1240 of the first lens assembly 1200 may be disposed at a position opposite to the first side surface 1230 of the first lens assembly 1200 with respect to the first lens barrel 1210.

The second side surface 1240 of the first lens assembly 1200 may face the second guide units 1710 and 1720. The movement of the second side surface 1240 of the first lens assembly 1200 in the optical axis direction may be guided by the second guide units 1710 and 1720.

The second side surface 1240 of the first lens assembly 1200 may be overlapped with the second side surface 1340 of the second lens assembly 1300 in the optical axis direction. The length of the second side surface 1240 of the first lens assembly 1200 in the optical axis direction may be shorter than the length of the second side surface 1330 of the second lens assembly 1300 in the optical axis direction.

The second side surface 1240 of the first lens assembly 1200 may face the second driving unit 1520.

The second side surface 1240 of the first lens assembly 1200 may comprise fourth grooves 1242 and 1244. The fourth grooves 1242 and 1244 may face the second guide units 1710 and 1720. The fourth grooves 1242 and 1244 may face the second grooves 1712 and 1722 of the second guide units 1710 and 1720. The fourth grooves 1242 and 1244 may be formed in a 'V' shape. The fourth grooves 1242 and 1244 may be in contact with the second guide balls 1830 and 1840. The fourth grooves 1242 and 1244 may be in contact with the second guide balls 1830 and 1840 at two points.

The fourth grooves 1242 and 1244 may comprise a fourth-first groove 1242 and a fourth-second groove 1244. The fourth-first groove 1242 and the fourth-second groove 1244 may be spaced apart from each other in a direction perpendicular to the optical axis direction. The fourth-first groove 1242 and the fourth-second groove 1244 may be formed to have a shape and size corresponding to each other. The fourth-first groove 1242 may face the second-first groove 1712. The fourth-second groove 1244 may face the second-second home 1722. The fourth-first groove 1242 and the fourth-second groove 1244 may each be formed in a 'V' shape. The fourth-first groove 1242 may be in contact with the second-first guide ball 1830. The fourth-first groove 1242 may be in contact with the second-first guide ball 1830 at two points. The fourth-second groove 1244 may be in contact with the second-second guide ball 1840. The fourth-second groove 1244 may be in contact with the second-second guide ball 1840 at two points.

The sum of the length of the first side surface 1230 of the first lens assembly 1200 in the optical axis direction and the length of the first side surface 1330 of the second lens assembly 1300 in the optical axis direction may correspond to the sum of the length of the second side surface 1240 of the first lens assembly 1200 in the optical axis direction and the length of the second side surface 1340 of the second lens assembly 1300 in the optical axis direction.

The camera module 1010 may comprise a second lens assembly 1300. The second lens assembly 1300 may be disposed in the housing 1100. The second lens assembly 1300 may be disposed at one side of the first lens assembly 1200. The second lens assembly 1300 may comprise a second lens barrel 1310, a second lens group 1320, a first side surface 1330, and a second side surface 1340.

The second lens assembly 1300 may comprise a second lens barrel 1310. The second lens barrel 1310 may have a cylindrical shape. The second lens barrel 1310 may comprise an accommodating part formed therein. A second lens group 1320 may be disposed in the second lens barrel 1310. A first side surface 1330 and a second side surface 1340 may be formed to be extended from the second lens barrel 1310.

The second lens barrel 1310 may comprise a second hole 1312. The second hole 1312 may comprise at least one hole. In a state in which the second lens assembly 1300 is assembled inside the housing 1100, the second lens assembly 1300 may be aligned through the alignment mechanism 11000 through the upper and lower surfaces of the housing 1100 and the second hole 1312.

The second lens assembly 1300 may comprise a second lens group 1320. The second lens group 1320 may be disposed in the second lens barrel 1310. The second lens group 1320 may be disposed in an accommodating part formed inside the second lens barrel 1310. The second lens group 1320 may be aligned with the first lens group 1220 and the third lens group 1420 in the optical axis direction. The second lens group 1320 may comprise at least one lens.

The second lens assembly 1300 may comprise a first side surface 1330. The first side surface 1330 of the second lens assembly 1300 may be connected to the second lens barrel 1310. The first side surface 1330 of the second lens assembly 1300 may be formed in a rectangular plate shape. The first side surface 1330 of the second lens assembly 1300 may be disposed at one side of the second lens barrel 1310.

The first side surface 1330 of the second lens assembly 1300 may face the first guide units 1730 and 1740. The movement of the first side surface 1330 of the second lens assembly 1300 in the optical axis direction may be guided by the first guide units 1730 and 1740.

The first side surface 1330 of the second lens assembly 1300 may be overlapped with the first side surface 1230 of the first lens assembly 1200 in the optical axis direction. The length of the first side surface 1330 of the second lens assembly 1300 in the optical axis direction may be shorter than the length of the first side surface 1230 of the first lens assembly 1200 in the optical axis direction.

A first side surface 1330 of the second lens assembly 1300 may face the first driving unit 1510.

The first side surface 1330 of the second lens assembly 1300 may comprise fifth grooves 1332 and 1334. The fifth grooves 1332 and 1334 may face the first guide units 1730 and 1740. The fifth grooves 1332 and 1334 may face the first grooves 1732 and 1742 of the first guide units 1730 and 1740. The fifth grooves 1332 and 1334 may be formed in a 'V' shape. The fifth grooves 1332 and 1334 may be in contact with the third guide balls 1850 and 1860. The fifth grooves 1332 and 1334 may be in contact with the third guide balls 1850 and 1860 at two points.

The fifth grooves 1332 and 1334 may comprise a fifth-first groove 1332 and a fifth-second groove 1334. The fifth-first groove 1332 and a fifth-second groove 1334 may be spaced apart from each other in a direction perpendicular to the optical axis direction. The fifth-first groove 1332 and a fifth-second groove 1334 may be formed to have shapes and sizes corresponding to each other. The fifth-first groove 1332 may face the first-first groove 1732. The fifth-second groove 1334 may face the first-second groove 1742. The fifth-first groove 1332 and a fifth-second groove 1334 may each be formed in a 'V' shape. The fifth-first groove 1332 may be in contact with the third-first guide ball 1850. The fifth-first groove 1332 may be in contact with the third-first guide ball 1850 at two points. The fifth-second groove 1334 may be in contact with the third-second guide ball 1860. The fifth-second groove 1334 may be in contact with the third-second guide ball 1860 at two points.

The second lens assembly 1300 may comprise a second side surface 1340. The second side surface 1340 of the second lens assembly 1300 may be connected to the second lens barrel 1310. The second side surface 1340 of the second lens assembly 1300 may be formed in a rectangular plate shape. The second side surface 1340 of the second lens assembly 1300 may be disposed at the other side of the second lens barrel 1310. That is, the second side surface 1340 of the second lens assembly 1300 may be disposed at a position opposite to the first side surface 1330 of the second lens assembly 1300 with respect to the second lens barrel 1310.

The second side surface 1340 of the second lens assembly 1300 may face the second guide units 1710 and 1720. The movement of the second side surface 1340 of the second lens assembly 1300 in the optical axis direction may be guided by the second guide units 1710 and 1720.

The second side surface 1340 of the second lens assembly 1300 may be overlapped with the second side surface 1240 of the first lens assembly 1200 in the optical axis direction. The length of the second side surface 1340 of the second lens assembly 1300 in the optical axis direction may be longer than the length of the second side surface 1240 of the first lens assembly 1200 in the optical axis direction.

A fourth driving unit 1620 may be disposed on the second side surface 1340 of the second lens assembly 1300. A groove 1346 in which the fourth driving unit 1620 is disposed may be formed on the second side surface 1340 of the second lens assembly 1300. The second side surface 1340 of the second lens assembly 1300 may face the second driving unit 1520.

The second side surface 1340 of the second lens assembly 1300 may comprise sixth grooves 1342 and 1344. The sixth grooves 1342 and 1344 may face the second guide units 1710 and 1720. The sixth grooves 1342 and 1344 may face the second grooves 1712 and 1722 of the second guide units 1710 and 1720. The sixth grooves 1342 and 1344 may be formed in a 'V' shape. The sixth grooves 1342 and 1344 may be in contact with the fourth guide balls 1870 and 1880. The sixth grooves 1342 and 1344 may be in contact with the fourth guide balls 1870 and 1880 at two points.

The sixth grooves 1342 and 1344 may comprise a sixth-first groove 1342 and a sixth-second groove 1344. The sixth-first groove 1342 and the sixth-second groove 1344 may be spaced apart from each other in a direction perpendicular to the optical axis direction. The sixth-first groove 1342 and the sixth-second groove 1344 may be formed to have shapes and sizes corresponding to each other. The sixth-first groove 1342 may face the second-first groove 1712. The sixth-second groove 1344 may face the second-second groove 1722. A fourth driving unit 1620 may be disposed in a space between the sixth-first groove 1342 and the sixth-second groove 1344. The sixth-first groove 1342 may comprise a plurality of sixth-first grooves 1342 spaced apart from each other in the optical axis direction. The sixth-second groove 1344 may comprise a plurality of sixth-second grooves 1344 spaced apart from each other in the optical axis direction. The sixth-first groove 1342 and the sixth-second groove 1344 may be formed in a 'V' shape, respectively. The sixth-first groove 1342 may be in contact with the fourth-first guide ball 1870. The sixth-first groove 1342 may be in contact with the fourth-first guide ball 1870 at two points. The sixth-second groove 1344 may be in contact with the fourth-second guide ball 1880. The sixth-second groove 1344 may be in contact with the fourth-second guide ball 1880 at two points.

The camera module 1010 may comprise a third lens assembly 1400. The third lens assembly 1400 may be disposed in the housing 1100. The third lens assembly 1400 may be fixed to the housing 1100. The third lens assembly 1400 may be fixed to the front portion of the housing 1100. The third lens assembly 1400 may be disposed at the other side of the first lens group 1220. After the third lens assembly 1400 is first assembled on the side surface of the housing 1100, the first lens assembly 1200 and the second lens assembly 1300 may be disposed inside the housing 1100 to be assembled.

The third lens assembly 1400 may comprise a third lens group 1420. The third lens group 1420 of the third lens assembly 1400 may comprise at least one lens. The third lens group 1420 of the third lens assembly 1400 may be aligned with the first lens group 1220 and the second lens group 1320 in the optical axis direction.

The camera module 1010 may comprise a first driving unit 1510. The first driving unit 1510 may be disposed in the housing 1100. The first driving unit 1510 may be disposed on a side surface of the housing 1100. The first driving unit 1510 may be disposed in the groove 1102 of the housing 1100. The first driving unit 1510 may face the third driving unit 1610. The length of the first driving unit 1510 in the optical axis direction may be longer than the length of the third driving unit 1610 in the optical axis direction. A length of the first driving unit 1510 in a direction perpendicular to the optical axis direction may be longer than a length of the third driving unit 1610 in a direction perpendicular to the optical axis direction. The first driving unit 1510 may be a solenoid coil. Unlike this, when the third driving unit 1610 is a coil, the first driving unit 1510 may be a magnet. The first driving unit 1510 may move the first lens assembly 1200 in the optical axis direction through electromagnetic interaction with the third driving unit 1610.

The camera module 1010 may comprise a second driving unit 1520. The second driving unit 1520 may be disposed in the housing 1100. The second driving unit 1520 may be disposed on a side surface of the housing 1100. The second driving unit 1520 may be disposed in the groove 1102 of the housing 1100. The second driving unit 1520 may face the fourth driving unit 1620. The length of the second driving unit 1520 in the optical axis direction may be longer than the length of the fourth driving unit 1620 in the optical axis direction. A length of the second driving unit 1520 in a direction perpendicular to the optical axis direction may be longer than a length of the fourth driving unit 1620 in a direction perpendicular to the optical axis direction. The second driving unit 1520 may be a solenoid coil. Unlike this, when the fourth driving unit 1620 is a coil, the second driving unit 1520 may be a magnet. The second driving unit 1520 may move the second lens assembly 1300 in the optical axis direction through electromagnetic interaction with the fourth driving unit 1620.

The camera module 1010 may comprise a third driving unit 1610. The third driving unit 1610 may be disposed in the first lens assembly 1200. The third driving unit 1610 may be disposed on the first side surface 1230 of the first lens assembly 1200. The third driving unit 1610 may be disposed in the groove 1236 of the first side surface 1230 of the first lens assembly 1200. The third driving unit 1610 may be disposed between the third-first groove 1232 and the third-second groove 1234 of the first side surface 1230 of the first lens assembly 1200. The third driving unit 1610 may face the first driving unit 1510. The third driving unit 1610 may be a magnet. Unlike this, when the first driving unit 1510 is a magnet, the third driving unit 1610 may be a coil. The length of the third driving unit 1610 in the optical axis direction may be shorter than the length of the first driving unit 1510 in the optical axis direction. A length of the third driving unit 1610 in a direction perpendicular to the optical axis direction may be shorter than a length of the first driving unit 1510 in a direction perpendicular to the optical axis direction. A surface of the third driving unit 1610 opposite to the first driving unit 1510 may be magnetized with a first polarity, and a surface not facing the first driving unit 1510 may be magnetized with a second polarity. Unlike this, the surface of the third driving unit 1610 opposite to the first driving unit 1510 may be magnetized to have a first polarity and a second polarity. The third driving unit 1610 may move the first lens assembly 1200 in the optical axis direction through electromagnetic interaction with the first driving unit 1510.

The camera module 1010 may comprise a fourth driving unit 1620. The fourth driving unit 1620 may be disposed in the second lens assembly 1300. The fourth driving unit 1620 may be disposed on the second side surface 1340 of the second lens assembly 1300. The fourth driving unit 1620 may be disposed in the groove 1346 of the second side surface 1340 of the second lens assembly 1300. The fourth driving unit 1620 may be disposed between the sixth-first groove 1342 and the sixth-second groove 1344 of the second side surface 1340 of the second lens assembly 1300. The fourth driving unit 1620 may face the second driving unit 1520. The fourth driving unit 1620 may be a magnet. Unlike this, when the second driving unit 1520 is a magnet, the fourth driving unit 1620 may be a coil. The length of the fourth driving unit 1620 in the optical axis direction may be shorter than the length of the second driving unit 1520 in the optical axis direction. A length of the fourth driving unit 1620 in a direction perpendicular to the optical axis direction may be shorter than a length of the second driving unit 1520 in a direction perpendicular to the optical axis direction. A surface of the fourth driving unit 1620 that faces the second driving unit 1520 may be magnetized with a first polarity, and a surface that does not face the second driving unit 1520 may be magnetized with a second polarity. Unlike this, the surface of the fourth driving unit 1620 opposite to the second driving unit 1520 may be magnetized to have a first polarity and a second polarity. The fourth driving unit 1620 may move the second lens assembly 1300 in the optical axis direction through electromagnetic interaction with the second driving unit 1520.

That is, in a second embodiment of the present invention, the first lens assembly 1200 is moved in the optical axis direction through electromagnetic interaction between the first driving unit 1510 and the third driving unit 1610, and since the second lens assembly 1300 is moved in the optical axis direction through electromagnetic interaction between the second driving unit 1520 and the fourth driving unit 1620, a zooming function may be implemented.

The camera module 1010 may comprise a guide unit 1700. The guide unit 1700 may be disposed in the housing 1100. The guide unit 1700 may be integrally formed with the housing 1100. The guide unit 1700 may be integrally formed with the inner side of the housing 1100. Referring to FIG. 17, the inner surface of the guide unit 1700 and the housing 1100 may be integrally formed through the forming fixture 1900. Specifically, the first guide units 1730 and 1740 may be formed through the first forming fixture 1920, and the second guide units 1710 and 1720 may be formed through the second forming mechanism 1910.

The guide unit 1700 may be formed to be extended in the optical axis direction. The guide unit 1700 may guide movement of the first lens assembly 1200 and the second lens assembly 1300 in the optical axis direction. The guide unit 1710 may comprise first guide units 1730 and 1740 and second guide units 1710 and 1720.

The guide unit 1710 may comprise first guide units 1730 and 1740. The first guide units 1730 and 1740 may be formed symmetrically with respect to the optical axis with the second guide units 1710 and 1720. The first guide units 1730 and 1740 may be formed in positions corresponding to the second guide units 1730 and 1740 and have shapes corresponding to each other. The first guide units 1730 and 1740 may be formed to be extended in the optical axis direction. The first guide units 1730 and 1740 may comprise first grooves 1732 and 1742.

The first grooves 1732 and 1742 may face the first side surface 1230 of the first lens assembly 1200. The first grooves 1732 and 1742 may face the third grooves 1232 and 1234 of the first side surface 1230 of the first lens assembly 1200. The first grooves 1732 and 1742 may be in contact with at least a portion of the first guide balls 1810 and 1820. One of the first grooves 1732 and 1742 is in contact with one of the first guide balls 1810 and 1820 at one point, and the other of the first grooves 1732 and 1742 may be in contact with the other one of the first guide balls 1810 and 1820 at two points.

The first grooves 1732 and 1742 may face the first side surface 1330 of the second lens assembly 1300. The first grooves 1732 and 1742 may face the fifth grooves 1332 and 1334 of the first side surface 1330 of the second lens assembly 1300. The first grooves 1732 and 1742 may be in contact with at least a portion of the third guide balls 1850 and 1860. One of the first grooves 1732 and 1742 is in contact with one of the third guide balls 1850 and 1860 at one point, and the other one of the first grooves 1732 and 1742 may be in contact with the other one of the third guide balls 1850 and 1860 at two points.

The first guide units 1730 and 1740 may comprise a first-first guide unit 1730. The first-first guide unit 1730 may be spaced apart from the first-second guide unit 1740 in a direction perpendicular to the optical axis. The first-first guide unit 1730 may be disposed in the first-second guide unit 1740. The length of the first-first guide unit 1730 in the optical axis direction may correspond to the length of the first-second guide unit 1740 in the optical axis direction. The first-first guide unit 1730 may be formed to be extended in the optical axis direction. A length of the first-first guide unit 1730 in a direction perpendicular to the optical axis direction may be longer than a length of the first-second guide unit 1740 in a direction perpendicular to the optical axis direction.

The first-first guide unit 1730 may comprise a first-first groove 1732. The first-first groove 1732 may face the third-first groove 1232 of the first side surface 1230 of the first lens assembly 1200. At least a portion of the first-first guide ball 1810 may be disposed in the first-first groove 1732. Referring to FIGS. 10 to 15, the first-first groove 1732 may be formed in a 'V' shape. Referring to FIGS. 10 to 15, the first-first groove 1732 may be in contact with the first-first guide ball 1810 at two points. Unlike this, referring to FIGS. 8, 9, and 16, the first-first groove 1732 may be formed in a 'U' or 'L' shape. Referring to FIGS. 8, 9, and 16, the first-first groove 1732 may be in contact with the first-first guide ball 1810 at one point.

The first-first groove 1732 may face the fifth-first groove 1332 of the first side surface 1330 of the second lens assembly 1300. At least a portion of the third-first guide ball 1850 may be disposed in the first-first groove 1732. Referring to FIGS. 10 to 15, the first-first groove 1732 may be in contact with the third-first guide ball 1850 at two points. Referring to FIGS. 8, 9, and 16, the first-first groove 1732 may be in contact with the third-first guide ball 1850 at one point.

The first guide units 1730 and 1740 may comprise a first-second guide unit 1740. The first-second guide unit 1740 may be spaced apart from the first-first guide unit 1730 in a direction perpendicular to the optical axis. The first-second guide unit 1740 may be disposed below the first-first guide unit 1730. The length of the first-second guide unit 1740 in the optical axis direction may correspond to the length of the first-first guide unit 1730 in the optical axis direction. The first-second guide unit 1740 may be formed to be extended in the optical axis direction. A length of the first-second guide unit 1740 in a direction perpendicular to the optical axis direction may be shorter than a length of the first-first guide unit 1730 in a direction perpendicular to the optical axis direction.

The first-second guide unit 1740 may comprise a first-second groove 1742. The first-second groove 1742 may face the third-second groove 1234 of the first side surface 1230 of the first lens assembly 1200. At least a portion of the first-second guide ball 1820 may be disposed in the first-second groove 1742. Referring to FIGS. 10 to 15, the first-second groove 1742 may be formed in a 'U' or 'L' shape. Referring to FIGS. 10 to 15, the first-second groove 1742 may be in contact with the first-second guide ball 1820 at one point. Unlike this, referring to FIGS. 8, 9, and 16, the first-second groove 1742 may be formed in a 'V' shape. Referring to FIGS. 8, 9, and 16, the first-second groove 1742 may be in contact with the first-second guide ball 1820 at two points.

The first-second groove 1742 may face the fifth-second groove 1334 of the first side surface 1330 of the second lens assembly 1300. At least a portion of the third-second guide ball 1860 may be disposed in the first-second groove 1742. FIGS. 10 to 15, the first-second groove 1742 may be in contact with the third-second guide ball 1860 at one point. Unlike this, referring to FIGS. 8, 9, and 16, the first-second groove 1742 may be in contact with the third-second guide ball 1860 at two points.

The guide unit 1710 may comprise second guide units 1710 and 1720. The second guide units 1710 and 1720 may be formed symmetrically with respect to the first guide units 1730 and 1740 with respect to the optical axis. The second guide units 1710 and 1720 may be formed in positions corresponding to the first guide units 1730 and 1740 and have shapes corresponding to each other. The second guide units 1710 and 1720 may be formed to be extended in the optical axis direction. The second guide units 1710 and 1720 may comprise second grooves 1712 and 1722.

The second grooves 1712 and 1722 may face the second side surface 1240 of the first lens assembly 1200. The second grooves 1712 and 1722 may face the fourth grooves 1242 and 1244 of the second side surface 1240 of the first lens assembly 1200. The second grooves 1712 and 1722 may be in contact with at least a portion of the second guide balls 1830 and 1840. One of the second grooves 1712 and 1722 is in contact with one of the second guide balls 1830 and 1840 at one point, and the other one of the second grooves 1712 and 1722 may be in contact with the second guide balls 1830 and 1840 at two points.

The second grooves 1712 and 1722 may face the second side surface 1340 of the second lens assembly 1300. The second grooves 1712 and 1722 may face the sixth grooves 1342 and 1344 of the second side surface 1340 of the second lens assembly 1300. The second grooves 1712 and 1722 may be in contact with at least a portion of the fourth guide balls 1870 and 1880. One of the second grooves 1712 and 1722 is in contact with one of the fourth guide balls 1870 and 1880 at one point, and the other of the second grooves 1712 and 1722 is in contact with the other one of the fourth guide balls 1870 and 1880 at two points.

The second guide units 1710 and 1720 may comprise a second-first guide unit 1710. The second-first guide unit 1710 may be spaced apart from the second-second guide unit 1720 in a direction perpendicular to the optical axis. The second-first guide unit 1710 may be disposed in the second-second guide unit 1720. The length of the second-first guide unit 1710 in the optical axis direction may correspond to the length of the second-second guide unit 1720 in the optical axis direction. The second-first guide unit 1710 may be formed to be extended in the optical axis direction. A length of the second-first guide unit 1710 in a direction perpendicular to the optical axis direction may be longer than a length of the second-second guide unit 1720 in a direction perpendicular to the optical axis direction.

The second-first guide unit 1710 may comprise a second-first groove 1712. The second-first groove 1712 may face the fourth-first groove 1242 of the second side surface 1240 of the first lens assembly 1200. At least a portion of the second-first guide ball 1830 may be disposed in the second-first groove 1712. Referring to FIGS. 10 to 15, the second-first groove 1712 may be formed in a 'V' shape. Referring to FIGS. 10 to 15, the second-first groove 1712 may be in contact with the second-first guide ball 1830 at two points. Unlike this, referring to FIGS. 8, 9, and 16, the second-first groove 1712 may be formed in a 'U' or 'L' shape. Referring to FIGS. 8, 9, and 16, the second-first groove 1712 may be in contact with the second-first guide ball 1830 at one point.

The second-first groove 1712 may face the sixth-first groove 1342 of the second side surface 1340 of the second lens assembly 1300. At least a portion of the fourth-first guide ball 1870 may be disposed in the second-first groove 1712. Referring to FIGS. 10 to 15, the second-first groove 1712 may be in contact with the fourth-first guide ball 1870 at two points. Referring to FIGS. 8, 9, and 16, the second-first groove 1712 may be in contact with the fourth-first guide ball 1870 at one point.

The second guide units 1710 and 1720 may comprise a second-second guide unit 1720. The second-second guide unit 1720 may be spaced apart from the second-first guide unit 1710 in a direction perpendicular to the optical axis. The second-second guide unit 1720 may be disposed below the second-first guide unit 1710. The optical axis direction length of the second-second guide unit 1720 may correspond to the optical axis direction length of the second-first guide unit 1710. The second-second guide unit 1720 may be formed to be extended in the optical axis direction. A length of the second-second guide unit 1720 in a direction perpendicular to the optical axis direction may be shorter than a length of the second-first guide unit 1710 in a direction perpendicular to the optical axis direction.

The second-second guide unit 1720 may comprise a second-second groove 1722. The second-second groove 1722 may face the fourth-second groove 1244 of the second side surface 1240 of the first lens assembly 1200. At least a portion of the second-second guide ball 1840 may be disposed in the second-second groove 1722. Referring to FIGS. 10 to 15, the second-second groove 1722 may be formed in a 'U' or 'L' shape. Referring to FIGS. 10 to 15, the second-second groove 1722 may be in contact with the second-second guide ball 1840 at one point. Unlike this, referring to FIGS. 8, 9, and 16, the second-second groove 1722 may be formed in a 'V' shape. Referring to FIGS. 8, 9, and 16, the second-second groove 1722 may be in contact with the second-second guide ball 1840 at two points.

The second-second groove 1722 may face the sixth-second groove 1344 of the second side surface 1340 of the second lens assembly 1300. At least a portion of the fourth-second guide ball 1880 may be disposed in the second-second groove 1722. Referring to FIGS. 10 to 15, the second-second groove 1722 may be in contact with the fourth-second guide ball 1880 at one point. Unlike this, referring to FIGS. 8, 9, and 16, the second-second groove 1722 may be in contact with the fourth-second guide ball 1880 at two points.

The camera module 1010 may comprise a guide ball 1800. The guide ball 1800 may be disposed between the first lens assembly 1200 and the guide unit 1700. The guide ball 1800 may be disposed between the second lens assembly 1300 and the guide unit 1700.

The guide ball 1800 may comprise first guide balls 1810 and 1820. The first guide balls 1810 and 1820 may be disposed between the first side surface 1230 of the first lens assembly 1200 and the first guide units 1730 and 1740.

The first guide balls 1810 and 1820 may comprise a first-first guide ball 1810. The first-first guide ball 1810 may be disposed between a first-first groove 1732 of the first-first guide unit 1730 and a third-first groove 1232 of the first side surface 1230 of the first lens assembly 1200. The first-first guide ball 1810 may comprise two guide balls 1812 and 1814 spaced apart from each other in the optical axis direction.

The first guide balls 1810 and 1820 may comprise a first-second guide ball 1820. The first-second guide ball 1820 may be disposed between a first-second groove 1742 of the first-second guide unit 1740 and a third-second groove 1234 of the first side surface 1230 of the first lens assembly 1200. The first-second guide ball 1820 may comprise two guide balls 1822 and 1824 spaced apart from each other in the optical axis direction.

The guide ball 1800 may comprise second guide balls 1830 and 1840. The second guide balls 1830 and 1840 may be disposed between the second side surface 1240 of the first lens assembly 1200 and the second guide units 1710 and 1720.

The second guide balls 1830 and 1840 may comprise a second-first guide ball 1830. The second-first guide ball 1830 may be disposed between the second-first groove 1712 of the second-first guide unit 1710 and the fourth-first groove 1242 of the second side surface 1240 of the first lens assembly 1200.

The second guide balls 1830 and 1840 may comprise a second-second guide ball 1840. The second-second guide ball 1840 may face the second-second groove 1722 of the second-second guide unit 1720 and the fourth-second groove 1244 of the second side surface 1240 of the first lens assembly 1200.

The guide ball 1800 may comprise third guide balls 1850 and 1860. The third guide balls 1850 and 1860 may be disposed between the first side surface 1330 of the second lens assembly 1300 and the first guide units 1730 and 1740.

The third guide balls 1850 and 1860 may comprise a third-first guide ball 1850. The third-first guide ball 1850 may be disposed between the first-first groove 1732 of the first-first guide unit 1730 and the fifth-first grooves 1332 of the first side surface 1330 of the second lens assembly 1300.

The third guide balls 1850 and 1860 may comprise a third-second guide ball 1860. The third-second guide ball 1860 may be disposed between the first-second groove 1742 of the first-second guide unit 1840 and the fifth-second groove 1334 of the first side surface 1330 of the second lens assembly 1300.

The guide ball 1800 may comprise fourth guide balls 1870 and 1880. The fourth guide balls 1870 and 1880 may be disposed between the second side surface 1340 of the second lens assembly 1300 and the second guide units 1710 and 1720.

The fourth guide balls 1870 and 1880 may comprise a fourth-first guide ball 1870. The fourth-first guide ball 1870 may be disposed between the second-first groove 1712 of the second-first guide unit 1710 and the sixth-first groove 1342 of the second side surface 1340 of the second lens assembly 1300. The fourth-first guide ball 1870 may comprise two guide balls 1872 and 1874 spaced apart from each other in the optical axis direction.

The fourth guide balls 1870 and 1880 may comprise a fourth-second guide ball 1880. The fourth-second guide ball 1880 may be disposed between the second-second groove 1722 of the second-second guide unit 1720 and the sixth-second grooves 1223 of the second side surface 1240 of the second lens assembly 1300.

The fourth-second guide ball 1800 may comprise two guide balls 1882 and 1884 spaced apart from each other in the optical axis direction.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A camera module comprising:
a housing;
a lens assembly disposed in the housing;
a first driving unit disposed on the lens assembly;

a second driving unit disposed on the housing and facing the first driving unit;
a first guide unit disposed in the housing;
a second guide unit opposite to the first guide unit;
a substrate disposed on the housing; and
a sensor spaced apart from the lens assembly and configured to sense a position of the lens assembly in an optical axis direction and electrically connected to the substrate,
wherein the lens assembly comprises a first lens assembly configured to move along the first guide unit and a second lens assembly configured to move along the second guide unit,
wherein the sensor comprises a first sensor configured to sense a position of the first lens assembly and a second sensor configured to sense a position of the second lens assembly,
wherein the first sensor comprises two sensors spaced apart in the optical axis direction, and
wherein the second sensor comprises two sensors spaced apart in the optical axis direction.

2. The camera module of claim 1, comprising:
a sensor magnet disposed on the lens assembly and extending in the optical axis direction,
wherein a length of the sensor magnet in the optical axis direction is greater than a movement stroke of the lens assembly.

3. The camera module of claim 2, comprising a first yoke disposed between the lens assembly and the sensor magnet.

4. The camera module of claim 3, wherein the first yoke surrounds surfaces of the sensor magnet other than a surface facing the plurality of sensors.

5. The camera module of claim 2,
wherein the sensor magnet comprises a first sensor magnet disposed on the first lens assembly and a second sensor magnet disposed on the second lens assembly, and
wherein the first sensor magnet and the second sensor magnet are spaced apart from each other in the first direction perpendicular to the optical axis direction, and have corresponding lengths.

6. The camera module of claim 5, wherein the first driving unit comprises a first-first driving unit disposed on the first lens assembly and a first-second driving unit disposed on the second lens assembly, and
wherein the second driving unit comprises a second-first driving unit facing the first-first driving unit, and a second-second driving unit facing the first-second driving unit.

7. The camera module of claim 6, comprising a second yoke disposed between the lens assembly and the first driving unit,
wherein the second yoke comprises a second-first yoke disposed between the first-first driving unit and the first lens assembly, and a second-second yoke disposed between the first-second driving unit and the second lens assembly.

8. The camera module of claim 6, wherein a distance between the first-first driving unit and the first-second driving unit is greater than a distance between the first sensor magnet and the second sensor magnet.

9. The camera module of claim 6, wherein the first lens assembly is configured to move by an interaction between the first-first driving unit and the second-first driving unit, and
wherein the second lens assembly is configured to move by an interaction between the first-second driving and the second-second driving unit so that the second lens assembly moves separately from the first lens assembly.

10. The camera module of claim 5, wherein the first sensor magnet is not symmetric with the second sensor magnet with respective to an optical axis.

11. The camera module of claim 1, wherein the first driving unit comprises a magnet,
wherein the second driving unit comprises a coil, and
wherein the coil is spaced apart from the lens assembly.

12. A camera module comprising:
a housing;
a lens assembly disposed on the housing;
a first driving unit disposed in the lens assembly;
a second driving unit disposed on the housing and facing the first driving unit;
a sensor magnet disposed on the lens assembly and extending in an optical axis direction; and
a plurality of sensors disposed on the housing and facing the sensor magnet,
wherein the plurality of sensors comprises a first sensor and a second sensor spaced apart from the first sensor in the optical axis direction, and
wherein a sum of a distance between the first sensor and the second sensor and a movement stroke of the lens assembly corresponds to a length of the sensor magnet in the optical axis direction.

13. The camera module of claim 12, wherein a distance between the sensor magnet and a center of the lens assembly is shorter than a distance between the first driving unit and the center of the lens assembly.

14. The camera module of claim 12, wherein, in the optical axis direction, a length of the sensor magnet is greater than a length of the second driving unit.

15. A camera module comprising:
a housing;
a first lens assembly disposed in the housing;
a second lens assembly disposed in the housing;
a first driving magnet disposed on the first lens assembly;
a second driving magnet disposed on the second lens assembly;
a substrate disposed on the housing;
a first coil disposed on the substrate and configured to interact with the first driving magnet;
a second coil disposed on the substrate and configured to interact with the second driving magnet;
a sensor magnet disposed on at least any one of the first lens assembly and the second lens assembly; and
a plurality of sensors configured to sense the sensor magnet,
wherein the plurality of sensors are spaced apart from each other in an optical axis direction, and
wherein a length of the sensor magnet in the optical axis direction is greater than a spaced distance between the plurality of sensors in the optical axis direction.

16. The camera module of claim 15, wherein the length of the sensor magnet in the optical axis direction is greater than a length of the first coil in the optical axis direction.

17. The camera module of claim 15, wherein the sensor magnet comprises a first sensor magnet disposed on the first lens assembly and a second sensor magnet disposed on the second lens assembly, and
wherein a distance between the first driving magnet and the second driving magnet is greater than a distance between the first sensor magnet and the second sensor magnet.

18. The camera module of claim 17, wherein the first sensor magnet is not symmetric with the second sensor magnet with respective to an optical axis.

\* \* \* \* \*